US008699763B2

(12) United States Patent
Nada et al.

(10) Patent No.: US 8,699,763 B2
(45) Date of Patent: Apr. 15, 2014

(54) BIOMETRIC INFORMATION PROCESSING DEVICE, BIOMETRIC INFORMATION PROCESSING METHOD AND COMPUTER-READABLE STORAGE MEDIUM STORING A BIOMETRIC INFORMATION PROCESSING PROGRAM

(75) Inventors: Hajime Nada, Kawasaki (JP); Toshio Endoh, Kawasaki (JP); Takahiro Aoki, Kawasaki (JP); Shigefumi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 13/358,909

(22) Filed: Jan. 26, 2012

(65) Prior Publication Data

US 2012/0250954 A1    Oct. 4, 2012

(30) Foreign Application Priority Data

Mar. 29, 2011    (JP) ................. 2011-073174

(51) Int. Cl.
*G06K 9/00*        (2006.01)

(52) U.S. Cl.
USPC ........... 382/124; 382/125; 382/126; 382/128; 382/116; 382/134; 382/181; 382/190; 382/218; 382/276

(58) Field of Classification Search
CPC .......... G06K 9/00006; G06K 9/00087; G06K 2009/00932; G06K 9/00067; G06K 9/00073; G06K 9/0008; G06K 9/00892; G06K 9/00899; G06K 19/0718; G06K 9/001; G06K 9/46
USPC ......... 382/124, 125, 126, 128, 116, 134, 181, 382/190, 218, 276
See application file for complete search history.

(56) References Cited

U.S. PATENT DOCUMENTS

| 8,180,118 B2 * | 5/2012 | Neil et al. ...................... 382/124 |
| 2006/0023919 A1 | 2/2006 | Okamura |
| 2008/0253619 A1 | 10/2008 | Hagino et al. |
| 2009/0232367 A1 * | 9/2009 | Shinzaki ........................ 382/124 |

FOREIGN PATENT DOCUMENTS

| EP | 1 780 657 A2 | 5/2007 |
| EP | 1 903 509 A1 | 3/2008 |
| EP | 2 009 596 A2 | 12/2008 |
| JP | 03-217984 | 9/1991 |
| JP | 2001-167280 | 6/2001 |
| JP | 2006-277341 | 10/2006 |
| WO | 2005/069212 A1 | 7/2005 |

OTHER PUBLICATIONS

J. L. Wayman, "Multifinger Penetration Rate and ROC Variability for Automatic Fingerprint Identification Systems", Jan. 1, 2004, pp. 305-316, XP002366886, 8Sections 15.4 and 15.7.

(Continued)

*Primary Examiner* — Mike Rahmjoo
(74) *Attorney, Agent, or Firm* — Staas & Halsey LLP

(57) ABSTRACT

A biometric information processing device includes, a biometric sensor configured to acquire a plurality of different biometric information elements; an authentication feature extracting unit configured to extract an authentication feature for use in authentication for each of the plurality of different biometric information elements acquired by the biometric sensor; a supplemental feature extracting unit configured to extract a supplemental feature relating to the authentication feature for each of the plurality of different biometric information elements; and a combined feature extracting unit configured to extract a combined feature in which a plurality of the supplemental features extracted by the supplemental feature extracting unit are reflected.

17 Claims, 39 Drawing Sheets

(56) References Cited

OTHER PUBLICATIONS

Peter Wild: "Single-sensor hand and footprint-based multimodal biometric recognition" In: "Single-sensor hand and footprint-based multimodal biometric recognition" Jan. 1, 2008, Universität Salzburg, Salzburg, XP055039949 pp. 1-98.

A. Kumar et al., "Combining Fingerprint, Palmprint and Hand-shape for User Authentication", 18th International Conference on Pattern Recognition (ICP'06), vol. 4, Jan. 1, 2006, pp. 549-552, XP055039950, DOI 10.1109/ICPR.2006.383 ISBN: 978-0-76-952521-1.

Cui Xin at al, "A contactless hand shape identification system", Advanced Computer Control (ICACC), 2011 3rd International conference on, IEEE, Jan. 18, 2011, pp. 561-565, XP031965495, DOI: 10.1109/ICACC.2001.6016476 ISBN: 978-1-4244-8809-4.

Gregory Hales et al, "A Multimodal Biometric System using Palm Vein and 10-Print Fingerprint Sensors", Cerias Annual Information Security Symposium, Mar. 30, 2010, Mar. 31, 2010, XP002684533, Purdue University, retrieved from the Internet: [retrieved on Oct. 3, 2010] URL:http://www.cerias.purdue.edu/site/symposium2010/presentation /#929-4d1.

Shahin M. K. et al, "A Multimodal Hand Vein, Hand Geometry, and Fingerprint Prototype Design for High Security Biometrics", Biomedical Engineering conference, 2008. CIBEC 2008. Cario International, IEEE, Piscataway, NJ, USA, Dec. 18, 2008 pp. 1-6, XP031425955, ISBN: 978-1-4244-2694-2.

Aythami Morales Moreno, "Estrategias para la Identificatiön de Personas con Sistemas Biomētricos Sin Contacto Basados en la Mano", Programa de Doctorado, Feb. 7, 2011, XP055039954 Las Palmas de Gran Canaria Retrieved from the Internet: URL:http//www.idetic. ulpgc.es/idetic/images/Tesis/Aythami_Morales/Tesis_Aythami. pdf [retrieved on Oct. 3, 2012] *caputilo IV:4.1 pp. 52-58.

Miguel A. Ferrer et al: "Low Cost Multimodal Biometric Identification System based on Hand Geometry, Palm and Finger Print Texture". Security Technology, 2007 41st Annual IEEE International Carnahan Conference on, IEEE, PI, Oct. 1, 2007, pp. 52-58, XP031155243, ISBN: 978-14244-1129-0 section III-VII.

Wenjing Lu et al., "Fusion of Palm Dorsal Vein and Hand Geometry for Personal Identification Based on Linear Discriminant Analysis", Frontier of Computer Science and Technonlgy (FCST), 2010 Fifth International Conference on, IEEE, Piscataway, NJ, USA, Aug. 18, 2010, pp. 532-536, XP031755273, ISBN: 978-1-4244-7779-1.

Terence Sim et al: "Continuous Verification Using Multimodal Biometrics", IEEE Transactions on Pattern Analysis and Machine Intelligence, IEEE Service Center, Los Alamitos, CA, US, vol. 29, No. 4, Apr. 1, 2007, pp. 687-700, XP011168507, ISSN: 0162-8828, DOI:10.1109/TPAMI.2007.1010.

Anil K. Jain et al: "Biometrics of Next Generation: An Overview", Biometrics Research Group—General Biometrics, Feb. 1, 2010, XP055040155, retrieved from the Internet: URL:http://biometrics. cse.msu.edu/Publications/Generalbiometics/ JainKumarNextGenBiometrics _Book_Chap10.pdf [retrieved on Oct. 5, 2012].

Extended European Search report mailed Dec. 10, 2012 in European Application No. 12154177.5-1224.

J. L. Wayman, "Multifinger Penetration Rate and ROC Variability for Automatic Fingerprint Identification Systems", Jan. 1, 2004, pp. 305-315, XP002366886, *Sections 15.4 and 15.7.

"10. Large-Scale Applications" In: Bolle, Connell, Pankanti, Ratha, Senior: "Guide to Biometrics", Springer, XP002676630, ISBN: 0-387-400089-3, pp. 177, *Chapter introductory section, 2004.

* cited by examiner

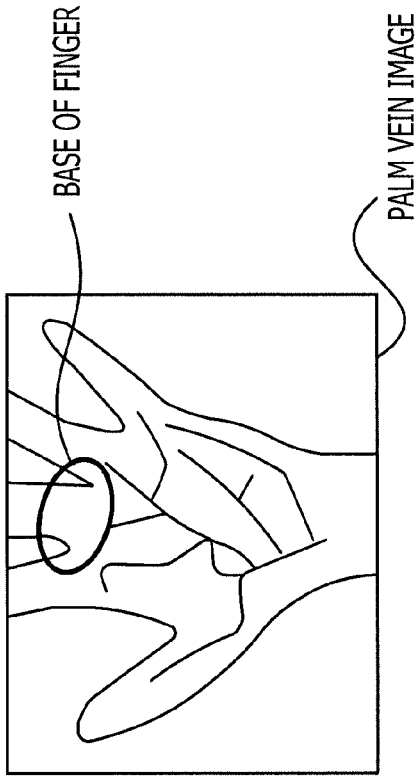

| | INFORMATION FOR USE IN SUPPLEMENTAL QUALITY DETERMINING UNIT | | | | | | | |
|---|---|---|---|---|---|---|---|---|
| | FINGERPRINT INFORMATION | | | | | PALM VEIN INFORMATION | | |
| | AREA OF FINGERPRINT | | | ACQUISITION TIME OF IMAGE | | PRESENCE/ABSENCE OF BASE OF FINGER | | ACQUISITION TIME OF IMAGE |
| | FINGERPRINT OF FIRST FINGER | FINGERPRINT OF SECOND FINGER | FINGERPRINT OF THIRD FINGER | FINGERPRINT OF FIRST FINGER | FINGERPRINT OF SECOND FINGER | FINGERPRINT OF THIRD FINGER | FIRST FINGER | SECOND FINGER | THIRD FINGER | |
| INFORMATION ABOUT USER α FOR USE IN SUPPLEMENTAL QUALITY DETERMINING UNIT | S1 | S2 | S3 | T1 | T2 | T3 | FOUND | FOUND | FOUND | t1 |

FIG. 6

| | AUTHENTICATION FEATURE | | | | SUPPLEMENTAL FEATURE | | |
|---|---|---|---|---|---|---|---|
| REGISTERED DATA ELEMENT ABOUT USER 1 | AUTHENTICATION FEATURE 1 OF FINGERPRINT OF FIRST FINGER | AUTHENTICATION FEATURE 1 OF FINGERPRINT OF SECOND FINGER | AUTHENTICATION FEATURE 1 OF FINGERPRINT OF THIRD FINGER | AUTHENTICATION FEATURE 1 OF PALM VEIN | COMBINED FEATURE 1 OF PALM VEIN AND FIRST FINGER | COMBINED FEATURE 1 OF PALM VEIN AND SECOND FINGER | COMBINED FEATURE 1 OF PALM VEIN AND THIRD FINGER |
| REGISTERED DATA ELEMENT ABOUT USER 2 | AUTHENTICATION FEATURE 2 OF FINGERPRINT OF FIRST FINGER | AUTHENTICATION FEATURE 2 OF FINGERPRINT OF SECOND FINGER | AUTHENTICATION FEATURE 2 OF FINGERPRINT OF THIRD FINGER | AUTHENTICATION FEATURE 2 OF PALM VEIN | COMBINED FEATURE 2 OF PALM VEIN AND FIRST FINGER | COMBINED FEATURE 2 OF PALM VEIN AND SECOND FINGER | COMBINED FEATURE 2 OF PALM VEIN AND THIRD FINGER |
| ... | ... | ... | ... | ... | ... | ... | ... |
| REGISTERED DATA ELEMENT ABOUT USER K | AUTHENTICATION FEATURE K OF FINGERPRINT OF FIRST FINGER | AUTHENTICATION FEATURE K OF FINGERPRINT OF SECOND FINGER | AUTHENTICATION FEATURE K OF FINGERPRINT OF THIRD FINGER | AUTHENTICATION FEATURE K OF PALM VEIN | COMBINED FEATURE K OF PALM VEIN AND FIRST FINGER | COMBINED FEATURE K OF PALM VEIN AND SECOND FINGER | COMBINED FEATURE K OF PALM VEIN AND THIRD FINGER |

FIG. 9A

| | SUPPLEMENTAL FEATURE | | | | | |
|---|---|---|---|---|---|---|
| | SUPPLEMENTAL FEATURE OF FINGERPRINT | | | SUPPLEMENTAL FEATURE OF PALM VEIN | | |
| | RIDGE PATTERN | | | DIRECTION IN WHICH FINGER EXTENDS | | |
| | FIRST FINGERPRINT | SECOND FINGERPRINT | THIRD FINGERPRINT | FIRST FINGER | SECOND FINGER | THIRD FINGER |
| SUPPLEMENTAL FEATURE OF USER $\alpha$ | RIDGE PATTERN 1 | RIDGE PATTERN 2 | RIDGE PATTERN 3 | $\theta 1$ | $\theta 2$ | $\theta 3$ |

FIG. 9B

| | COMBINED FEATURE | | |
|---|---|---|---|
| | RIDGE PATTERN OF FINGERPRINT WITH ADJUSTED ROTATION ANGLE | | |
| | FIRST FINGER | SECOND FINGER | THIRD FINGER |
| SUPPLEMENTAL FEATURE OF USER $\alpha$ | RIDGE PATTERN 1' | RIDGE PATTERN 2' | RIDGE PATTERN 3' |

FIG. 10A

| | SUPPLEMENTAL FEATURE | | | | | | |
|---|---|---|---|---|---|---|---|
| | SUPPLEMENTAL FEATURE OF FINGERPRINT | | | SUPPLEMENTAL FEATURE OF PALM VEIN | | | |
| | RANGE IN WHICH FINGER IS PRESENT | | | LOCATION OF BASE OF FINGER | | | DIRECTION IN WHICH FINGER EXTENDS (ANGLE) | | |
| | FINGERPRINT OF FIRST FINGER | FINGERPRINT OF SECOND FINGER | FINGERPRINT OF THIRD FINGER | INDEX FINGER OF RIGHT HAND | MIDDLE FINGER OF RIGHT HAND | RING FINGER OF RIGHT HAND | INDEX FINGER OF RIGHT HAND | MIDDLE FINGER OF RIGHT HAND | RING FINGER OF RIGHT HAND |
| SUPPLEMENTAL FEATURE OF USER α | RECTANGLE HAVING APEXES (X11, Y11), (X21, Y21), (X31, Y31), (X41, Y41) | RECTANGLE HAVING APEXES (X12, Y12), (X22, Y22), (X32, Y32), (X42, Y42) | RECTANGLE HAVING APEXES (X13, Y13), (X23, Y23), (X33, Y33), (X43, Y43) | (x1,y1) | (x2,y2) | (x3,y3) | $\theta 1$ | $\theta 2$ | $\theta 3$ |

FIG. 10B

| | COMBINED FEATURE | | |
|---|---|---|---|
| | FINGER TYPE | | |
| | FIRST FINGER | SECOND FINGER | THIRD FINGER |
| SUPPLEMENTAL FEATURE OF USER α | INDEX FINGER OF RIGHT HAND | MIDDLE FINGER OF RIGHT HAND | RING FINGER OF RIGHT HAND |

FIG. 11A

| | SUPPLEMENTAL FEATURE | | | | | | |
|---|---|---|---|---|---|---|---|
| | SUPPLEMENTAL FEATURE OF FINGERPRINT | SUPPLEMENTAL FEATURE OF PALM VEIN | | | | | |
| | ENTIRE FINGERPRINT IMAGE | LOCATION OF BASE OF FINGER | | | DIRECTION IN WHICH FINGER EXTENDS (ANGLE) | | |
| | | FIRST FINGER | SECOND FINGER | THIRD FINGER | FIRST FINGER | SECOND FINGER | THIRD FINGER |
| SUPPLEMENTAL FEATURE OF USER α | FINGERPRINT IMAGE F | (x1,y1) | (x2,y2) | (x3,y3) | θ1 | θ2 | θ3 |

FIG. 11B

| | COMBINED FEATURE | | |
|---|---|---|---|
| | RANGE IN WHICH FINGER IS ESTIMATED TO BE PRESENT | | |
| | FIRST FINGER | SECOND FINGER | THIRD FINGER |
| SUPPLEMENTAL FEATURE OF USER α | RECTANGLE HAVING APEXES (X11, Y11), (X21, Y21), (X31, Y31), (X41, Y41) | RECTANGLE HAVING APEXES (X12, Y12), (X22, Y22), (X32, Y32), (X42, Y42) | RECTANGLE HAVING APEXES (X13, Y13), (X23, Y23), (X33, Y33), (X43, Y43) |

FIG. 14A

| | SUPPLEMENTAL FEATURE | | | | | |
|---|---|---|---|---|---|---|
| | SUPPLEMENTAL FEATURE OF FINGERPRINT | | | SUPPLEMENTAL FEATURE OF PALM VEIN | | |
| | LOCATION OF CENTER OF FINGER | | | CENTRAL POINT AT BASE | | |
| | FINGERPRINT OF FIRST FINGER | FINGERPRINT OF SECOND FINGER | FINGERPRINT OF THIRD FINGER | FIRST FINGER | SECOND FINGER | THIRD FINGER |
| SUPPLEMENTAL FEATURE OF USER α | (X1,Y1) | (X2,Y2) | (X3,Y3) | (x1,y1) | (x2,y2) | (x3,y3) |

FIG. 14B

| | COMBINED FEATURE | | |
|---|---|---|---|
| | LENGTH OF FINGER | | |
| | FIRST FINGER | SECOND FINGER | THIRD FINGER |
| SUPPLEMENTAL FEATURE OF USER α | L1 | L2 | L3 |

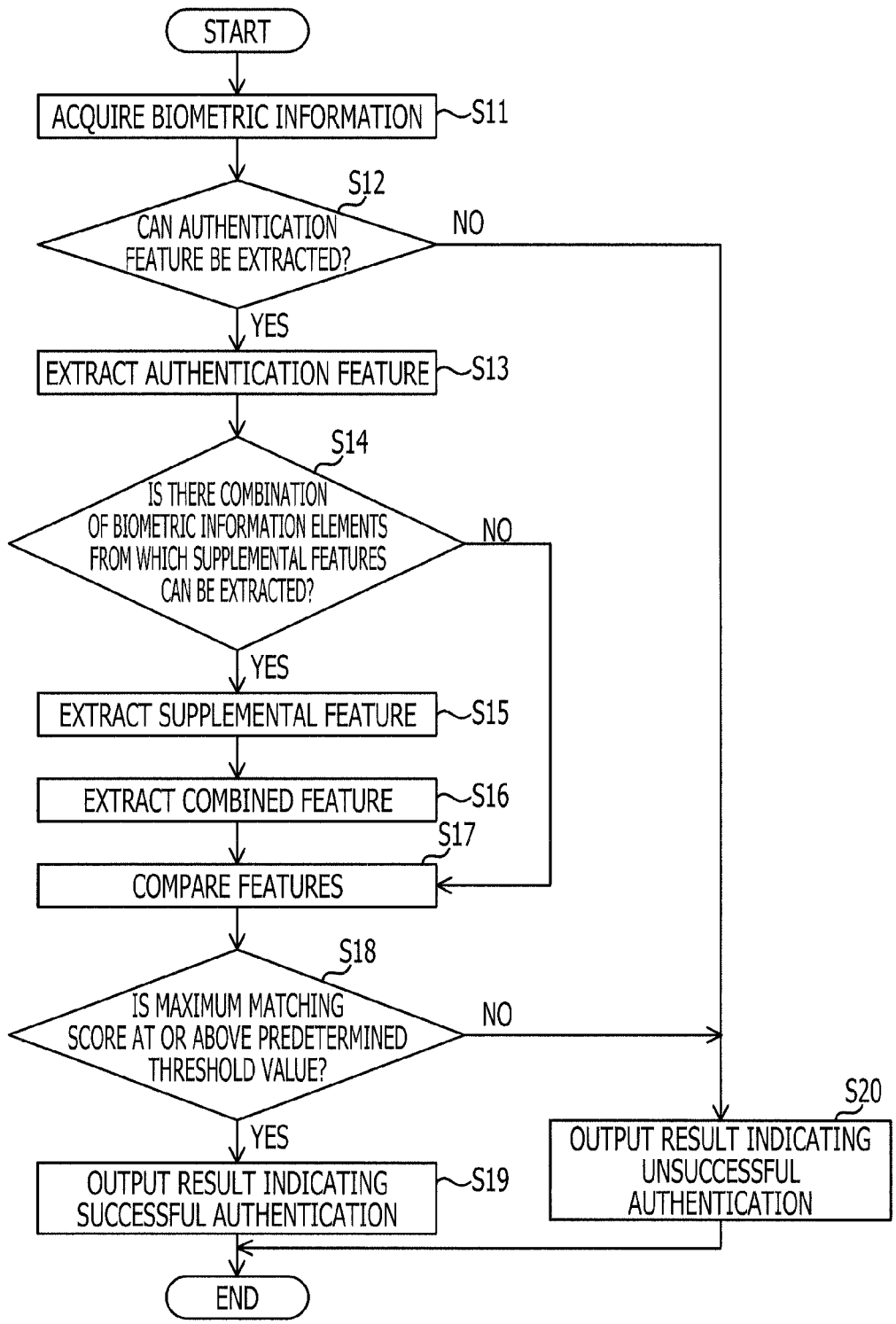

FIG. 17

| | AUTHENTICATION FEATURE | | | | COMBINED FEATURE | | |
|---|---|---|---|---|---|---|---|
| INPUT DATA OF USER α | AUTHENTICATION FEATURE α OF FINGERPRINT OF FIRST FINGER | AUTHENTICATION FEATURE α OF FINGERPRINT OF SECOND FINGER | AUTHENTICATION FEATURE α OF FINGERPRINT OF THIRD FINGER | AUTHENTICATION FEATURE α OF PALM VEIN | COMBINED FEATURE α OF PALM VEIN AND FIRST FINGER | COMBINED FEATURE α OF PALM VEIN AND SECOND FINGER | COMBINED FEATURE α OF PALM VEIN AND THIRD FINGER |

PREDETERMINED DISTANCE D

PREDETERMINED DISTANCE W

FIG. 38A

| | SUPPLEMENTAL FEATURE | | | | | | | |
|---|---|---|---|---|---|---|---|---|
| | EFFECTIVE FEATURE OF FINGERPRINT | | | SUPPLEMENTAL FEATURE OF PALM VEIN | | | | |
| | RANGE IN WHICH FINGER IS PRESENT | | | LOCATION OF BASE OF FINGER | | | DIRECTION IN WHICH FINGER EXTENDS (ANGLE) | | |
| | FINGERPRINT OF FIRST FINGER | FINGERPRINT OF SECOND FINGER | FINGERPRINT OF THIRD FINGER | FIRST FINGER | SECOND FINGER | THIRD FINGER | FIRST FINGER | SECOND FINGER | THIRD FINGER |
| SUPPLEMENTAL FEATURE OF USER α | RECTANGLE HAVING APEXES (X11, Y11), (X21, Y21), (X31, Y31), (X41, Y41) | RECTANGLE HAVING APEXES (X12, Y12), (X22, Y22), (X32, Y32), (X42, Y42) | RECTANGLE HAVING APEXES (X13, Y13), (X23, Y23), (X33, Y33), (X43, Y43) | (x1,y1) | (x2,y2) | (x3,y3) | θ1 | θ2 | θ3 |

FIG. 38B

| | COMBINED FEATURE | | |
|---|---|---|---|
| | RESULT OF DETERMINATION OF WHETHER INPUT IS VALID | | |
| | FIRST FINGER | SECOND FINGER | THIRD FINGER |
| SUPPLEMENTAL FEATURE OF USER α | VALID INPUT | VALID INPUT | VALID INPUT |

BIOMETRIC INFORMATION PROCESSING DEVICE, BIOMETRIC INFORMATION PROCESSING METHOD AND COMPUTER-READABLE STORAGE MEDIUM STORING A BIOMETRIC INFORMATION PROCESSING PROGRAM

CROSS-REFERENCE TO RELATED APPLICATION

This application is based upon and claims the benefit of priority of the prior Japanese Patent Application No. 2011-73174, filed on Mar. 29, 2011, the entire contents of which are incorporated herein by reference.

FIELD

The embodiments discussed herein are related to a biometric information processing device, a biometric information processing method, and a computer-readable storage medium storing a biometric information processing program.

BACKGROUND

Biometric authentication, which performs personal authentication using biometric information, has the need to reduce the probability that the system rejects enrolled persons as unidentified or unverified persons (false reject rate) and the probability that the system incorrectly accepts unenrolled or impostor persons as enrolled persons (false acceptance rate). One solution to that need is multi-biometric authentication, which performs authentication using a plurality of kinds of biometric information acquired from a plurality of sites.

A multi-biometric authentication device that uses fingerprints and palm prints is discussed in Japanese Laid-open Patent Publication No. 3-217984. A multi-biometric authentication device that employs a plurality of sensors is discussed in Japanese Laid-open Patent Publication No. 2006-277341. A technique that utilizes a positional relationship between two or more fingers is discussed in International Publication Pamphlet No. WO 2005/069212. A technique that captures a plurality of fingerprint data elements at predetermined time intervals is discussed in Japanese Laid-open Patent Publication No. 2001-167280.

SUMMARY

In accordance with an aspect of the embodiments, a biometric information processing device includes, a biometric sensor configured to acquire a plurality of different biometric information elements; an authentication feature extracting unit configured to extract an authentication feature for use in authentication for each of the plurality of different biometric information elements acquired by the biometric sensor; a supplemental feature extracting unit configured to extract a supplemental feature relating to the authentication feature for each of the plurality of different biometric information elements; and a combined feature extracting unit configured to extract a combined feature in which a plurality of the supplemental features extracted by the supplemental feature extracting unit are reflected.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 5A illustrates the basal portion of a finger, and FIG. 5B illustrates an example of data for use in determination by a supplemental quality determining unit;

FIG. 6 is a table that illustrates an example of registered data in a database;

FIG. 9A illustrates another example of a supplemental feature extracted from a fingerprint image, and FIG. 9B illustrates another example of a combined feature;

FIG. 10A illustrates still another example of a supplemental feature extracted from a fingerprint image, and FIG. 10B illustrates still another example of a combined feature;

FIG. 11A illustrates yet another example of a supplemental feature extracted from a fingerprint image, and FIG. 11B illustrates yet another example of a combined feature;

FIG. 14A is a table that illustrates another example of a supplemental feature extracted from each biometric information element, and FIG. 14B is a table that illustrates another example of a combined feature extracted from the supplemental features;

FIG. 16 illustrates an example of a flowchart of the biometric authentication process;

FIG. 17 illustrates an example of input data;

FIG. 38A is a table that illustrates supplemental features, and FIG. 38B is a table that illustrates a combined feature acquired from the supplemental features illustrated in FIG. 38A.

DESCRIPTION OF EMBODIMENTS

Examples of usable biometric information in the following embodiments include, but are not limited to, a fingerprint image, a palm print image, and a vein image. A plurality of fingerprint images acquired from a plurality of fingers may also be used. An authentication feature, a supplemental feature, and a combined feature used in the following embodiments are defined as described below.

An authentication feature is data for use in a comparing process relating to personal authentication, the data being individually extracted from each biometric information. Examples of the authentication feature include a pattern of a fingerprint image, a positional relationship of minutiae of a fingerprint, and a pattern of a palm vein image. Alternatively, the authentication feature may include in part a feature for use in narrowing matching candidates. For example, the authentication feature may include a fingerprint pattern together with a pattern of, a fingerprint image and may be used in narrowing matching candidates by the classification of fingerprint patterns.

A supplemental feature is data for use in a process of extracting a combined feature separately, the data being extracted from biometric information separately from an authentication feature and relating to the authentication feature. Examples of the supplemental feature include the location of a biometric component, the direction in which a finger extends, the ridge pattern of a fingerprint, the location of the center of a fingerprint, and the location of the base of a finger. The accuracy of identifying an individual from another person of the supplemental feature may be lower than that of the authentication feature to increase the frequency of enabling extraction. The supplemental feature has a characteristic in which a new feature may be extracted by combining a plurality of supplemental features extracted from biometric information elements.

A combined feature is data for use in a comparing process according to supplemental authentication, the, data in which a combination of a plurality of supplemental features of a single user is reflected. The supplemental authentication may be authentication for identifying an individual, similar to personal authentication, and may also be authentication for use in narrowing matching candidates.

Embodiments are described below with reference to the drawings. A first embodiment is first described.

Figure 1A:
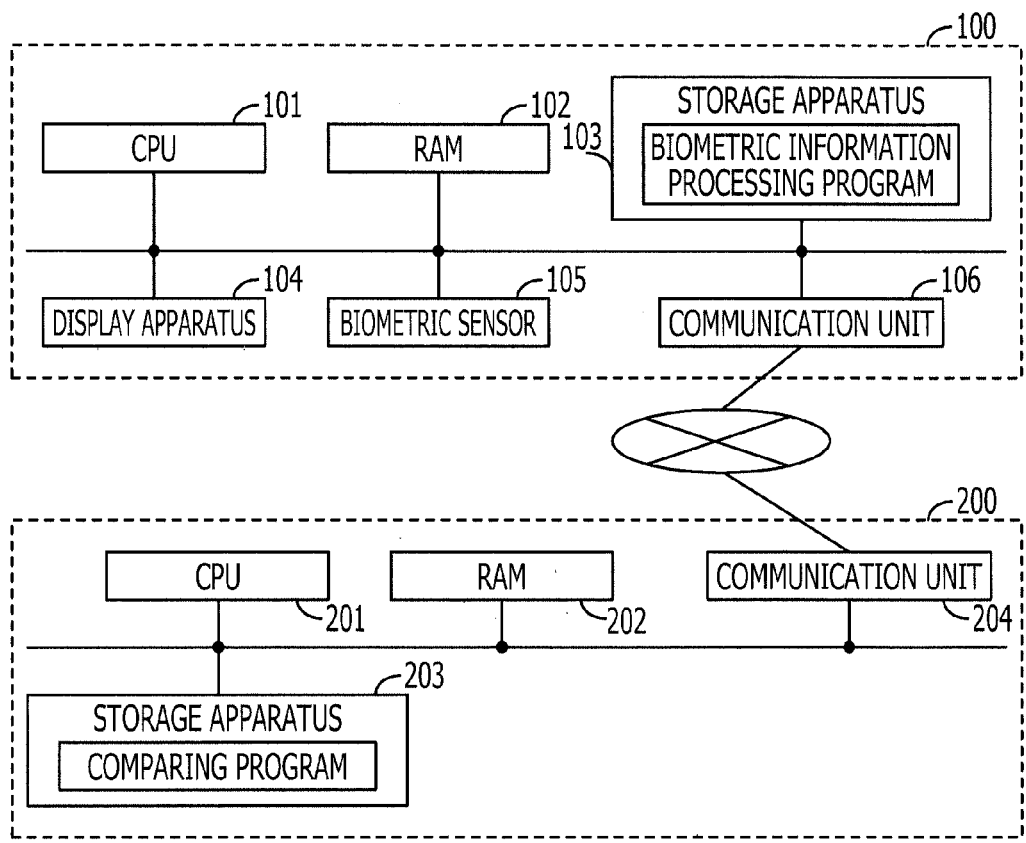
FIG. 1A is a block diagram that illustrates a hardware configuration of a biometric information processing device according to a first embodiment.
Figure 1B:
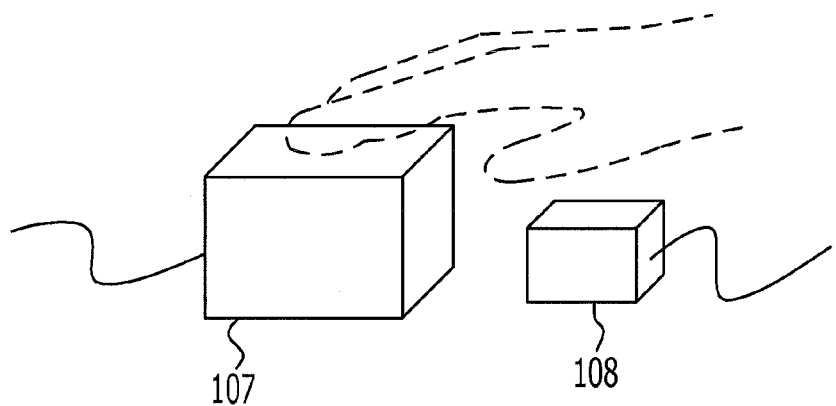
FIG. 1B is a schematic diagram of a biometric sensor.

FIG. 1A is a block diagram that illustrates a hardware configuration of a biometric information processing device 100 according to the first embodiment. FIG. 1B is a schematic diagram of a biometric sensor 105 described below. With reference to FIG. 1A, the biometric information processing device 100 includes a CPU 101, a random-access memory (RAM) 102, a storage apparatus 103, a display apparatus 104, the biometric sensor 105, and a communication unit 106. These units are connected together with, for example, a bus. The biometric information processing device 100 is connected to a server 200 over a network.

The CPU 101 is a central processing unit. The CPU 101 includes one or more cores. The RAM 102 is volatile memory that temporarily stores a program executable by the CPU 101 and data that may be processed by the CPU 101.

The storage apparatus 103 is a non-volatile storage apparatus. Examples of the storage apparatus 103 include a read-only memory (ROM), a solid-state drive (SSD), such as flash memory, and a hard disk driven by a hard disk drive. A biometric information processing program according to the present embodiment is stored in the storage apparatus 103. The display apparatus 104 may be a liquid crystal display, an electroluminescent, panel, or another type of display and displays a result of a biometric information process.

The biometric sensor 105 is a sensor for acquiring a plurality of different biometric information elements. The "plurality of different biometric information elements" used here are different kinds of biometric information, such as a fingerprint and a vein or a face and a fingerprint. Accordingly, the different biometric information elements do not include a combination of the same kind of biometric information, such as an index finger fingerprint and a middle finger fingerprint. In the present embodiment, the biometric sensor 105 acquires a fingerprint image and a palm vein image as an example. With reference to FIG. 1B, the biometric sensor 105 includes a fingerprint sensor 107 and a vein sensor 108. The fingerprint sensor 107 may be an optical sensor, a capacitance sensor, or another type of sensor and acquires a fingerprint image of one or more fingers. The fingerprint sensor 107 may be of the contact type or the non-contact type. In the present embodiment, the fingerprint sensor 107 has a size that allows a fingerprint image of each of an index finger, a middle finger, and a ring finger to be acquired. The vein sensor 108 may be a complementary metal-oxide semiconductor (CMOS) camera, for example. The vein sensor 108 may be provided with a light for emitting light, including near-infrared light.

The communication unit 106 may be a connection interface to a local area network (LAN), for example. The biometric information processing device 100 communicates with the server 200 on a network through the communication unit 106 and exchanges information therewith. The server 200 includes a CPU 201, a RAM 202, a storage apparatus 203, and a communication unit 204. The storage apparatus 203 stores a comparing program.

The biometric information processing program stored in the storage apparatus 103 in the biometric information processing device 100 is developed to the RAM 102 such that the program is executable. The CPU 101 executes the biometric information processing program developed on the RAM 102. This enables each processing to be performed by the biometric information processing device 100. The execution of the biometric information processing program may perform a biometric data registering process and a biometric authentication process. The biometric data registering process is the process of registering an authentication feature of a new unenrolled user in a database as an authentication feature for use in a comparing process according to personal authentication and registering a combined feature of that user in the database as a combined feature for use in a comparing process according to supplemental authentication. The biometric authentication process is the process of identifying a user to be authenticated using personal authentication based on comparison of an authentication feature acquired by the biometric sensor 105 against authentication features in the database. In the present embodiment, supplemental authentication based on comparison of a combined feature extracted from biometric information acquired by the biometric sensor 105 against combined features in the database is performed in the biometric authentication process, thus improving the accuracy of identifying a user to be authenticated.

Figure 2:
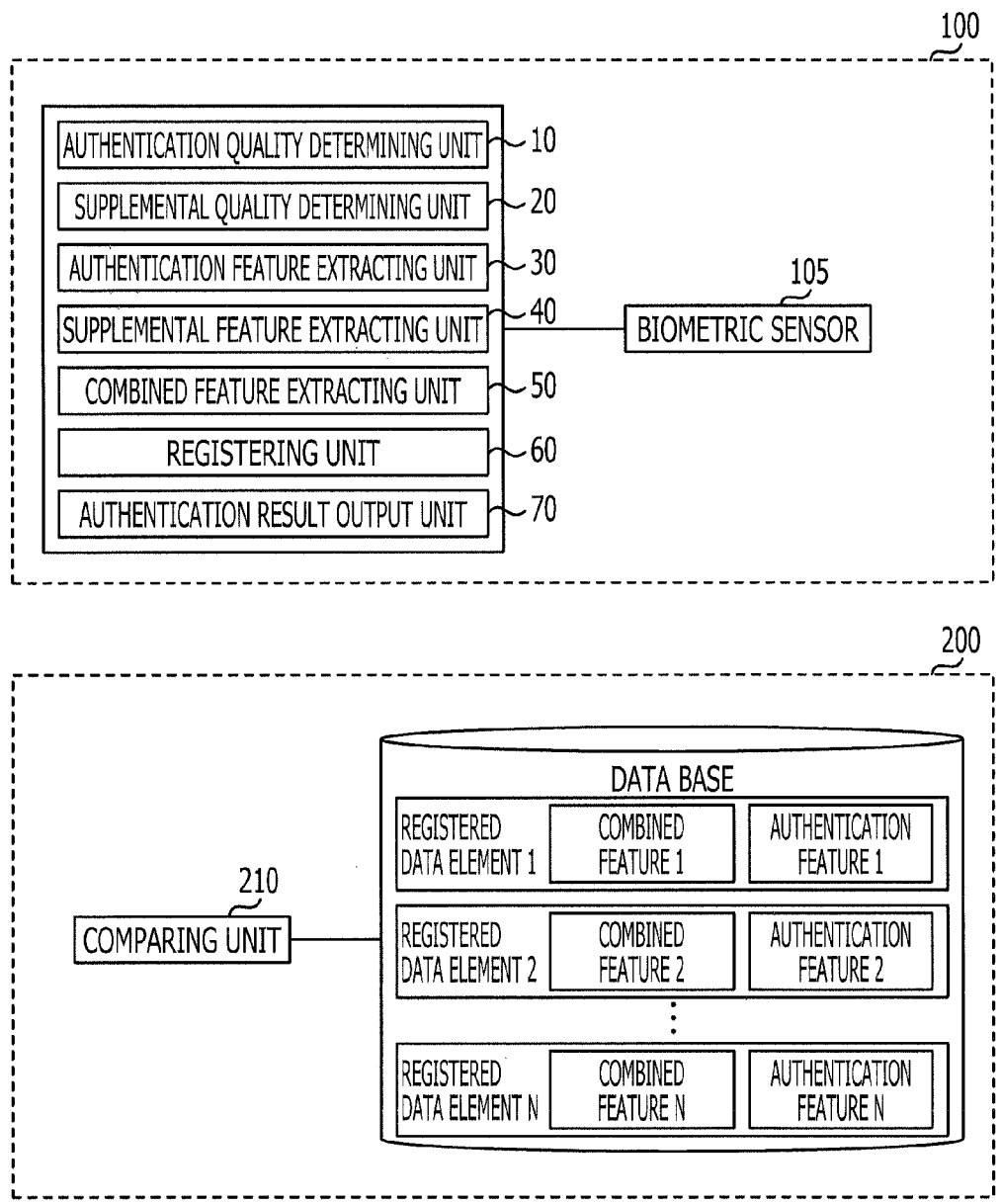
FIG. 2 is a block diagram of functions performed by execution of a biometric information processing program.

FIG. 2 is a block diagram of functions performed by execution of the biometric information processing program. The execution of the biometric information processing program implements an authentication quality determining unit 10, a supplemental quality determining unit 20, an authentication feature extracting unit 30, a supplemental feature extracting unit 40, a combined feature extracting unit 50, a registering unit 60, and an authentication result output unit 70. The execution of the comparing program stored in the storage apparatus 203 implements a comparing unit 210.

Figure 3:
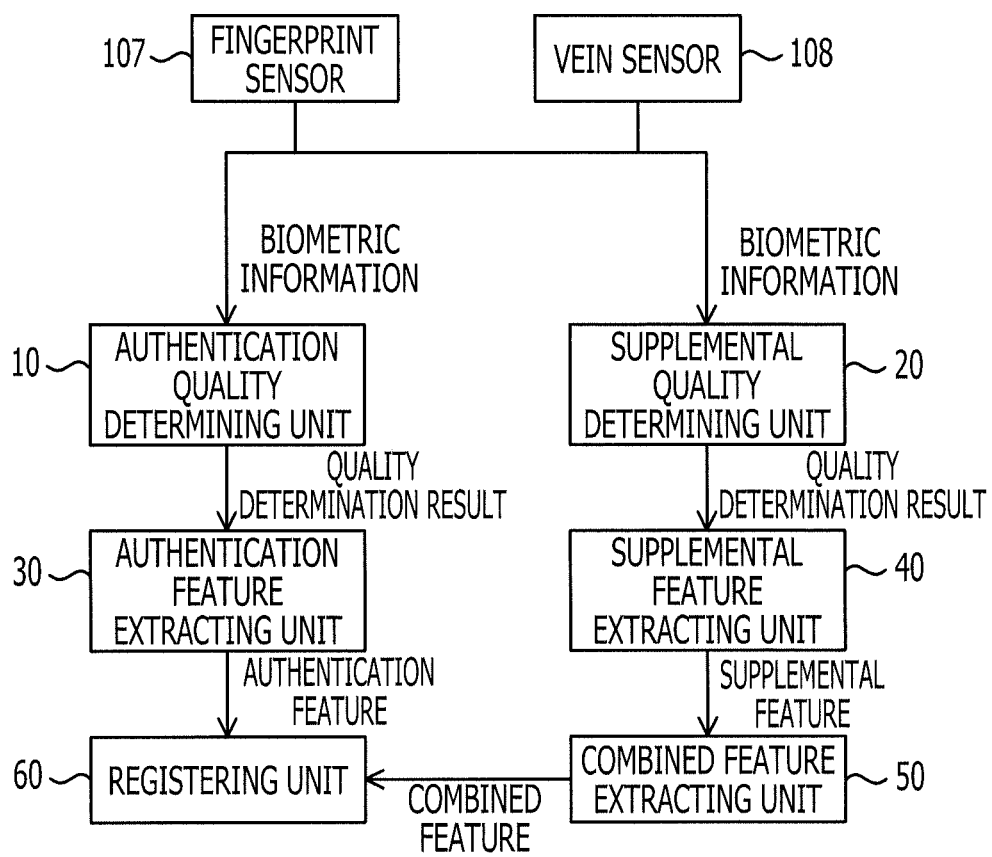
FIG. 3 is a block diagram of functions performed in a biometric data registering process.
Figure 4:
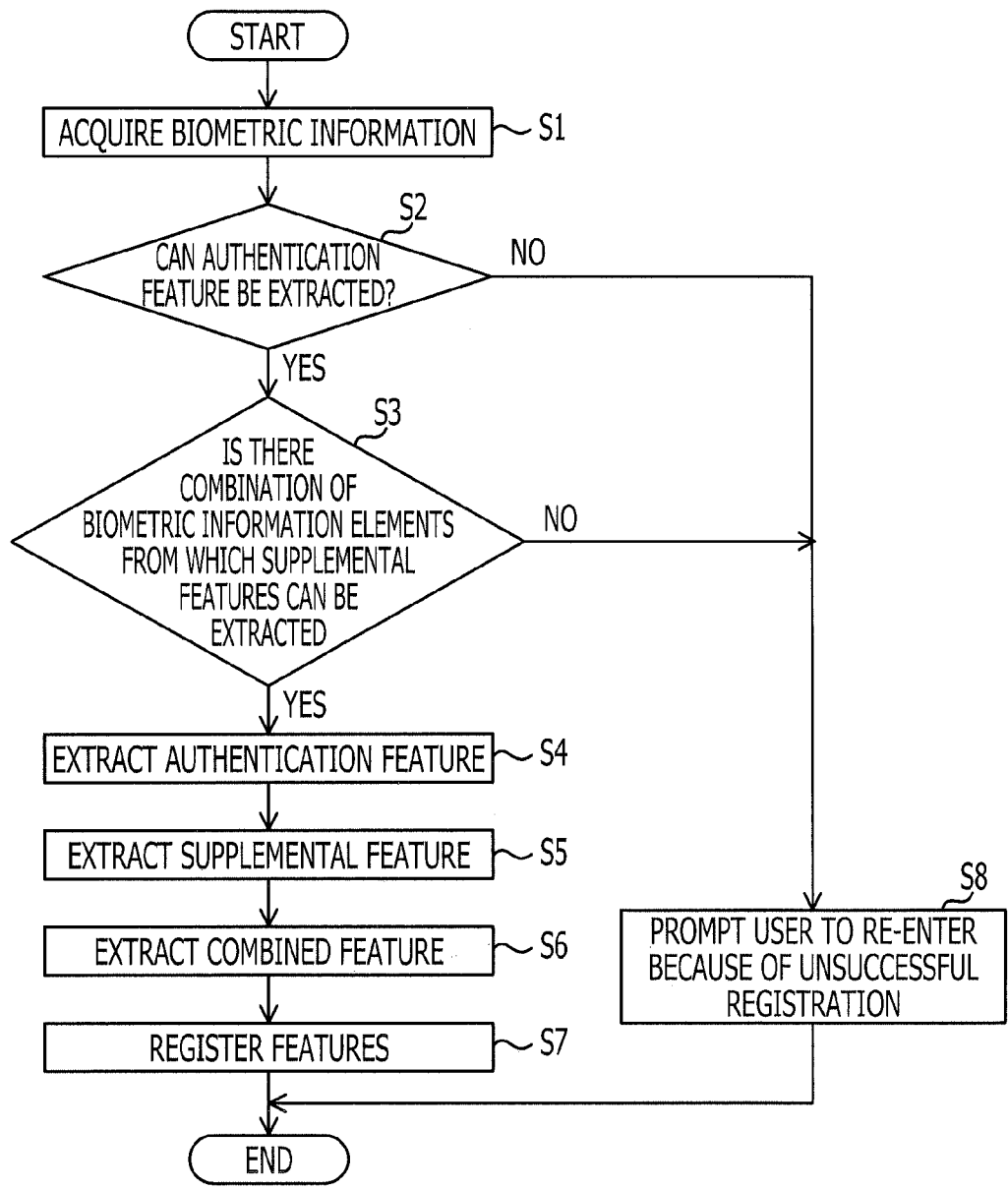
FIG. 4 illustrates an example of a flowchart of the biometric data registering process.

The biometric data registering process is described below. FIG. 3 is a block diagram of functions performed in the biometric data registering process, FIG. 4 illustrates an example of a flowchart of the biometric data registering process. An example of the biometric data registering process is described below with reference to FIGS. 3 and 4.

The biometric sensor 105 acquires a plurality of different biometric information elements about a new user (operation S1). Specifically, the fingerprint sensor 107 acquires a fingerprint image, and the vein sensor 108 acquires a palm vein image. The authentication quality determining unit 10 determines whether an authentication feature may be extracted from each of the biometric information elements (operation S2). Specifically, the authentication quality determining unit 10 determines whether an authentication feature may be extracted from each of the fingerprint image and the palm vein image acquired in operation S1. For example, when the area of the biometric image acquired in operation S1 is at or above a predetermined value Th, it may be determined that an authentication feature may be extracted. Alternatively, in the case of a fingerprint image, when the ratio between the valley lines and ridge lines is within a certain range and the image is crisp without being excessively affected by moisture or dryness, it may be determined that an authentication feature of the fingerprint may be extracted. When the palm is substantially horizontal, it may be determined that an authentication feature of the palm vein may be extracted.

When "Yes" is determined in operation S2, the supplemental quality determining unit 20 determines whether there is a combination of biometric information elements from which supplemental features may be extracted (operation S3). Specifically, when a supplemental feature may be extracted from the fingerprint image and a supplemental feature may be extracted from the palm vein image, the supplemental quality determining unit 20 determines that there is a combination of the biometric information elements from which supplemental features may be extracted.

For example, with reference to FIG. 5A, when the palm vein image includes the basal portion of a finger, the supplemental quality determining unit 20 may determine that a supplemental feature may be extracted. Preferably, the criterion for determination in operation S3 may be lower than that for determination in operation S2. Alternatively, when the palm vein image includes a portion of a finger having a predetermined length that allows the direction of the finger to be recognized, it may be determined that a supplemental feature may be extracted. Alternatively, when the area of the biometric image is at or above a predetermined value Th' that is smaller than the predetermined value Th, it may be determined that a supplemental feature may be extracted. This is because the accuracy of authentication in supplemental authentication is allowed to be lower than that in personal authentication. In operation S3, the supplemental quality determining unit 20 may determine whether a combined feature may be extracted from the supplemental features. For example, when the difference between the times when a plurality of biometric information elements are acquired is at or below a predetermined value, the supplemental quality determining unit 20 may determine that a combined feature may be extracted from the plurality of biometric information elements. FIG. 5B illustrates an example of data for use in determination by the supplemental quality determining unit 20. The data elements illustrated in FIG. 5B are temporarily stored in the storage apparatus 103 or the RAM 102 in the biometric information processing device 100.

When "Yes" is determined in operation S3, the authentication feature extracting unit 30 extracts an authentication feature from each of the biometric information elements (operation S4). Specifically, the authentication feature extracting unit 30 extracts an authentication feature from each of the fingerprint image and the palm vein image. Then, the supplemental feature extracting unit 40 extracts a supplemental feature from each of the biometric information elements (operation S5). Specifically, the supplemental feature extracting unit 40 extracts a supplemental feature from each of the fingerprint image and the palm vein image.

Then, the combined feature extracting unit 50 extracts a combined feature from a combination of the supplemental features (operation S6). Then, the registering unit 60 registers the authentication feature acquired from each biometric information element and the combined feature in association with the identification (ID) of the new user in the database as registered data (operation S7). In the example illustrated in FIG. 2, the database is stored in the storage apparatus 203 in the server 200. After operation S7, the process illustrated in the flowchart is completed.

FIG. 6 is a table that illustrates an example of registered data in the database. In the example illustrated in FIG. 6, for each user, each of authentication features of first to third fingers and an authentication feature of a palm vein is recorded as an authentication feature. A combined feature extracted from a supplemental feature of the palm vein and a supplemental feature of each of the first to third fingers is also recorded.

FIG. 6 is a table for use in one-to-N authentication based on the premise that a user to be authenticated is compared against a plurality of enrolled users. For one-to-one authentication based on the premise that a user to be authenticated is compared with a single enrolled user, the above-described database may record an authentication feature and a combined feature for not a plurality of users but the single user.

When "No" is determined in operation S2 or operation S3, the display apparatus 104 displays information prompting the user to re-enter biometric information or the like (operation S8). After operation S8, the process illustrated in the flowchart is completed.

Figure 7:
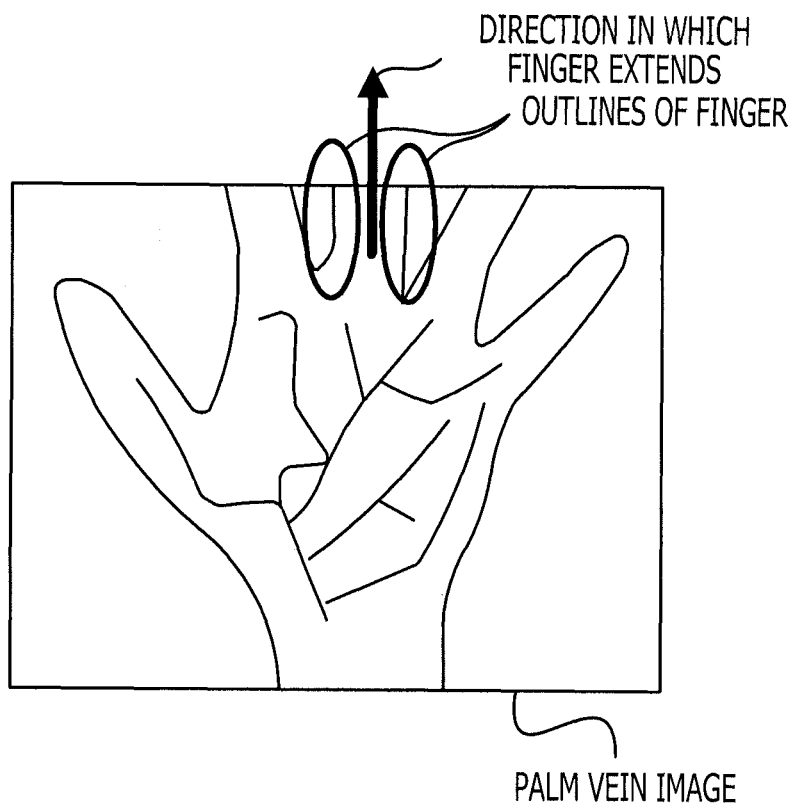
FIG. 7 illustrates an example of a supplemental feature extracted from a palm vein image.

FIG. 7 illustrates an example of a supplemental feature extracted from a palm vein image. With reference to FIG. 7, the direction in which a finger extends may be extracted as a supplemental feature. The direction in which a finger extends may be the direction in which the outline on one side at the base of the finger points to the fingertip. Alternatively, the direction in which a finger extends may be the direction in which the middle line or the like of the outlines on both sides at the base of the finger extends.

Figure 8A:
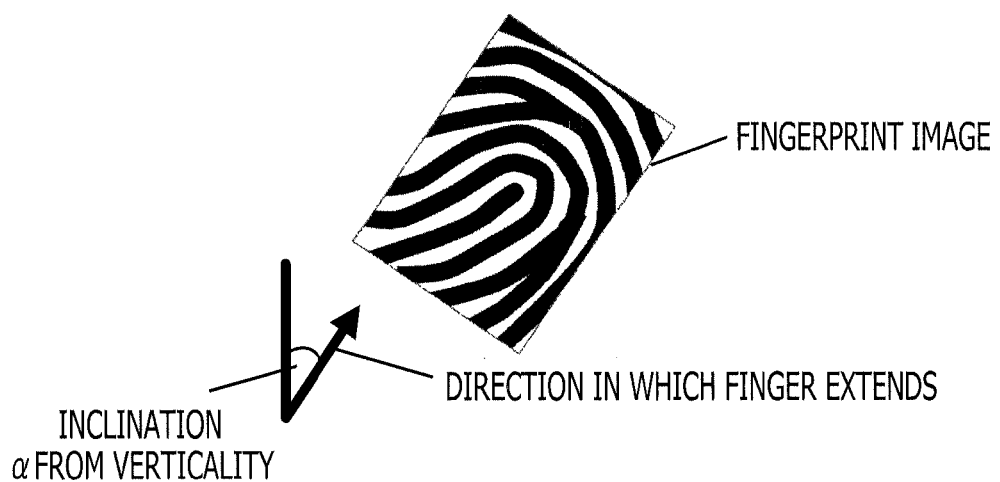
FIG. 8A illustrates an example of a supplemental feature extracted from a fingerprint image.
Figure 8B:
FIG. 8B illustrates an example of a combined feature.

FIG. 8A illustrates an example of a supplemental feature extracted from a fingerprint image. With reference to FIG. 8A, the ridge pattern of a fingerprint may be extracted as a supplemental feature. FIG. 8B illustrates an example of a combined feature extracted from a combination of a supplemental feature extracted from a fingerprint image and a supplemental feature extracted from a palm image. With reference to FIG. 8B, a result of rotating the ridge pattern extracted from the fingerprint image by an angle formed by the direction in which the finger extends may be extracted as a combined feature. For example, when the direction in which a finger extends is tilted from a specific direction by an angle α, a result of rotating the ridge pattern by the angle α in the specific direction may be extracted as a combined feature. If a fingerprint image is rotated in advance, angular adjustment may be omitted in a comparing process.

FIG. 9A is a table that illustrates an example of a supplemental feature extracted from each biometric information element. In the example illustrated in FIG. 9A, the ridge pattern of each of first to third fingers is recorded as a supplemental feature extracted from a fingerprint image. The direction (angle θ) in which each of the first to third fingers extends is recorded as a supplemental feature extracted from a palm image. The data elements illustrated in FIG. 9A are temporarily stored in the storage apparatus 103 or the RAM 102 in the biometric information processing device 100 until a combined feature may be extracted.

FIG. 9B is a table that illustrates an example of a combined feature extracted from supplemental features. In the example illustrated in FIG. 9B, the fingerprint ridge pattern of each of the first to third fingers in which the rotation angle of each of the first to third fingers has been adjusted is recorded as a combined feature. In the present embodiment, the data elements illustrated in FIG. 9B are recorded in the database in the storage apparatus 203 in the server 200.

As a supplemental feature extracted from a fingerprint image, a range in which a fingerprint is present may be used. As a supplemental feature extracted from a palm image, the location of the base of a finger and the direction in which the finger extends in consideration of a difference between the right and left hands may be used. As a combined feature extracted from these supplemental features, the type of a finger contained in a fingerprint image may be used. As the type of a finger, ten types of fingers of the right and left hands may be used.

FIG. 10A is a table that illustrates another example of a supplemental feature extracted from each biometric information element. In the example illustrated in FIG. 10A, the range in which each of first to third fingers is present is recorded as a supplemental feature extracted from a fingerprint image. The location of the base of each of the first to third fingers and the direction (angle θ) in which each of the first to third fingers extends are recorded as supplemental features extracted from a palm image. The data elements illustrated in FIG. 10A are temporarily stored in the storage apparatus 103 or the RAM 102 in the biometric information processing device 100 until a combined feature is extracted.

FIG. 10B is a table that illustrates an example of a combined feature extracted from the supplemental features. In the example illustrated in FIG. 10B, the type of each of the first to third fingers is recorded as a combined feature. In the present embodiment, the data elements illustrated in FIG. 10B are recorded in the database in the storage apparatus 203 in the server 200.

As a supplemental feature extracted from a fingerprint image, the entire fingerprint image may be used. As a supplemental feature extracted from a palm image, the location of the base of a finger and the direction in which the finger extends in consideration of a difference between the right and left hands may be used. As a combined feature extracted from these supplemental features, a range in which the fingerprint of each finger is estimated to be present from the entire fingerprint image may be used. In this case, the authentication feature extracting unit 30 may extract each fingerprint image cut from the combined feature as an authentication feature. Determining the quality of a fingerprint image and restricting a cut range by the use of a combined feature increases the speed of processing of each of the authentication quality determining unit 10 and the authentication feature extracting unit 30.

FIG. 11A is a table that illustrates another example of a supplemental feature extracted from each biometric information element. In the example illustrated in FIG. 11A, as a supplemental feature extracted from a fingerprint image, the entire fingerprint image is recorded. The location of the base of each of the first to third fingers and the direction (angle θ) in which each of the first to third fingers extends are recorded as supplemental features extracted from a palm image. The data elements illustrated in FIG. 11A are temporarily stored in the storage apparatus 103 or the RAM 102 in the biometric information processing device 100 until a combined feature may be extracted.

FIG. 11B is a table that illustrates an example of a combined feature extracted from the supplemental features. In the example illustrated in FIG. 11B, the range in which the fingerprint of each of the first to third fingers is estimated to be present is recorded as a combined feature. In the present embodiment, the data elements illustrated in FIG. 11B are recorded in the database in the storage apparatus 203 in the server 200.

Figure 12A:
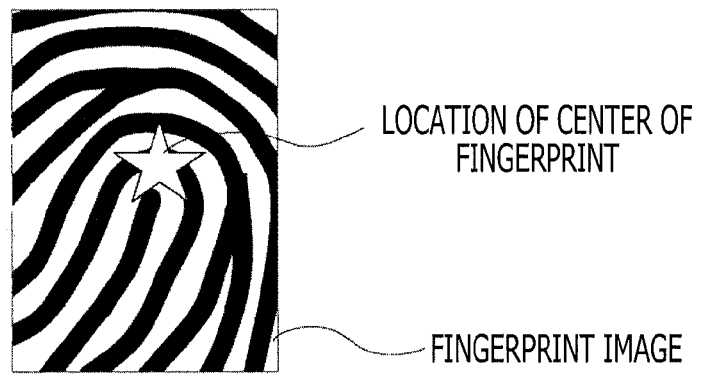
FIG. 12A illustrates the location of the center of a fingerprint.

As a supplemental feature extracted from a fingerprint image, a specific point of a fingerprint may be extracted. For example, the location of the center of the fingerprint or the point at the extremity of the fingertip in the fingerprint image may be extracted. FIG. 12A illustrates the location of the center of a fingerprint. With reference to FIG. 12A, the center of the fingerprint is a point that indicates a semicircular flow contained in the fingerprint and is also called a core. In a whorled fingerprint, the center of the whorls is the center of the fingerprint. As a method of calculating the center of a fingerprint, a technique described in Japanese Patent No. 2790689 may be used.

Figure 12B:
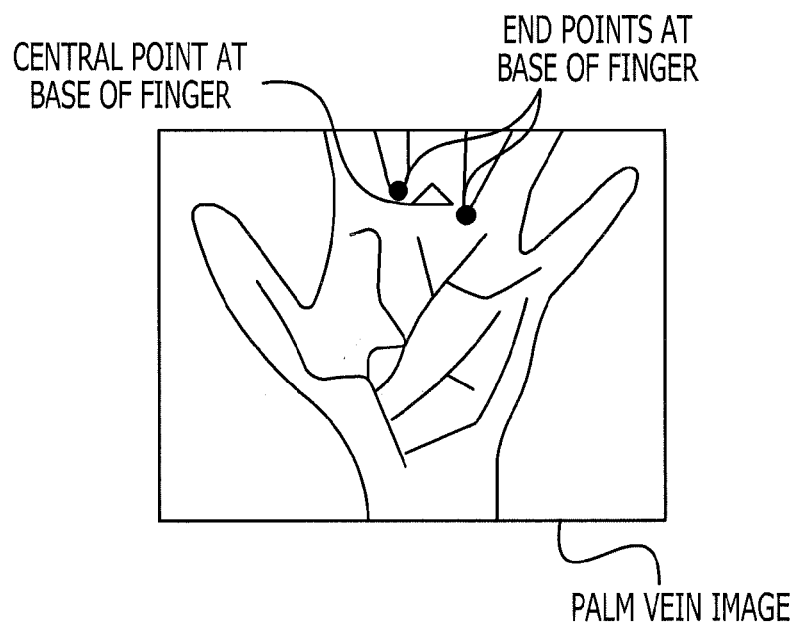
FIG. 12B illustrates the end points at the base of a finger and the central point of the end points at the base of the finger.
Figure 13:
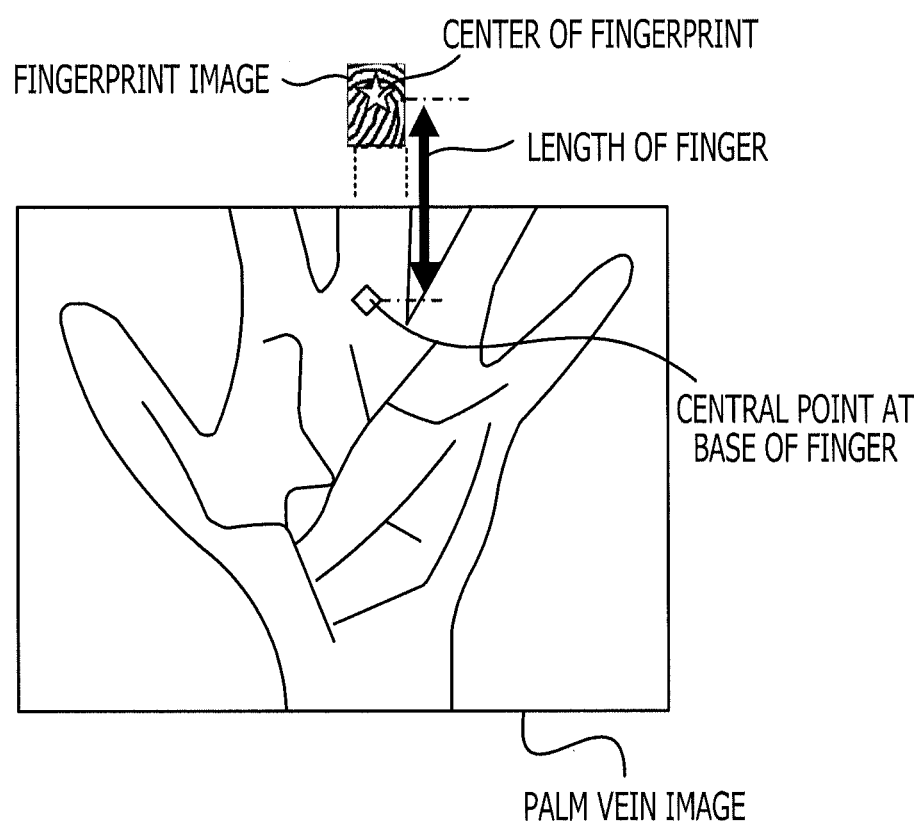
FIG. 13 illustrates an example in which the length of a finger calculated from the center of the fingerprint and the central point of the end points at the base of the finger is used as a combined feature.

As a supplemental feature extracted from a palm image, a specific point at the base of a finger may be extracted. For example, an end point at the base of a finger, or the central point of two end points sandwiching a single finger at its base may be extracted. The end point at the base of a finger may be a point at which the curvature of the outline at the base is the largest, for example. Alternatively, the end point at the base of a finger may be a point at which the coordinate value in the outline when the direction of the fingertip of the middle finger is an axis of coordinates is the smallest. FIG. 12B illustrates the end points at the base of a finger and the central point of the end points at the base of the finger. As a combined feature extracted from these supplemental features, the distance between a specific point of the fingerprint and a specific point at the base of the finger may be extracted. FIG. 13 illustrates an example in which the length of a finger calculated from the center of the fingerprint and the central point of the end points at the base of the finger is used as a combined feature.

FIG. 14A is a table that illustrates another example of a supplemental feature extracted from each biometric information element. In the example illustrated in FIG. 14A, the center of the fingerprint of each of first to third fingers is recorded as a supplemental feature extracted from a fingerprint image. The central point at the base of each of the first to third fingers is recorded as a supplemental feature extracted from a palm image. The data elements illustrated in FIG. 14A are temporarily stored in the storage apparatus 103 or the RAM 102 in the biometric information processing device 100 until a combined feature may be extracted.

FIG. 14B is a table that illustrates an example of a combined feature extracted from the supplemental features. In the example illustrated in FIG. 14B, the length of each of the first to third fingers calculated from the center of the fingerprint and the central point at the base of the finger is recorded as a combined feature. In the present embodiment, the data elements illustrated in FIG. 14B are recorded in the database in the storage apparatus 203 in the server 200.

Figure 15:
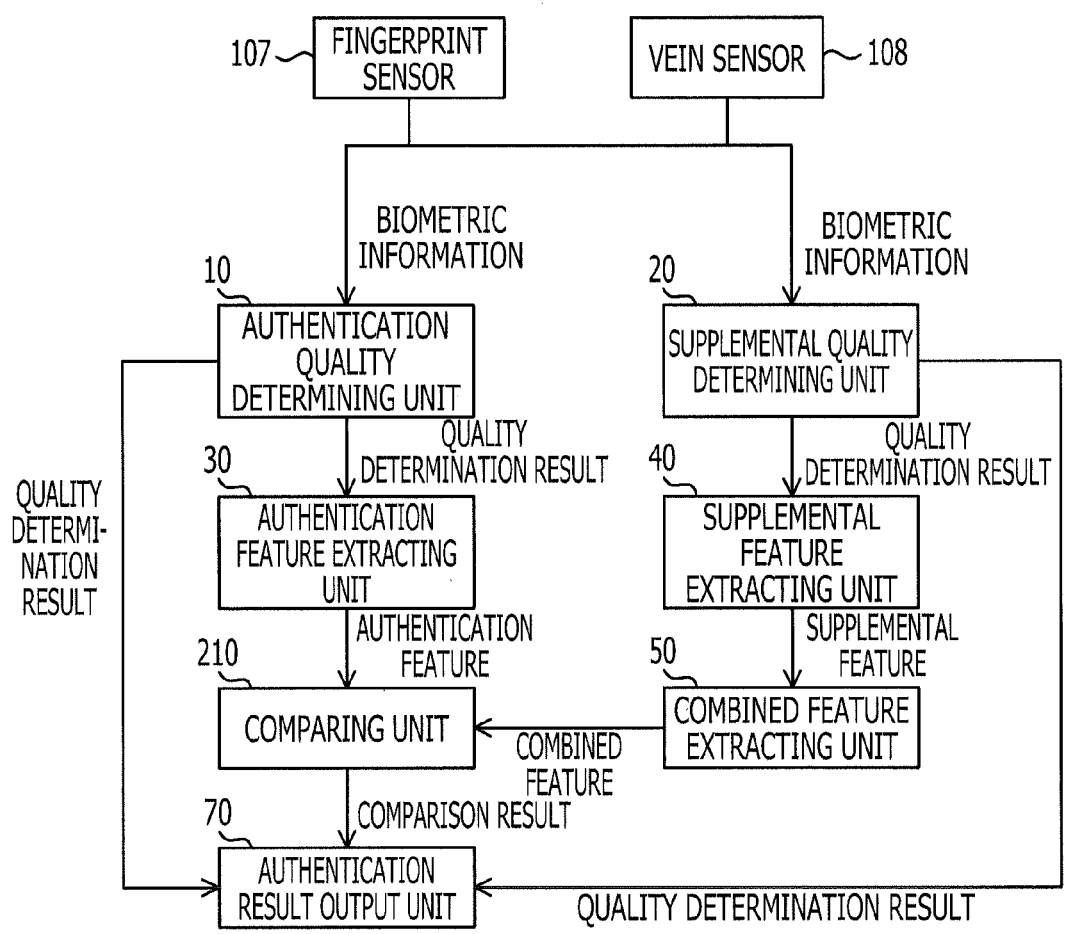
FIG. 15 is a block diagram of functions performed in execution of a biometric authentication process.

The biometric authentication process is described below. When a user to be authenticated tries to log in to a terminal that includes the biometric information processing device 100, the biometric information processing device 100 executes the biometric authentication process. FIG. 15 is a block diagram of functions performed in execution of the biometric authentication process. FIG. 16 illustrates an example of a flowchart of the biometric authentication process. With reference to FIGS. 15 and 16, an example of the biometric authentication process is described below. An authentication feature and a combined feature extracted from a plurality of biometric information elements about the same user acquired through the biometric sensor 105 in the biometric authentication process are referred to as input data. FIG. 17 illustrates an example of the input data.

The biometric sensor 105 acquires a plurality of different biometric information elements about a user to be authenticated (operation S11). Specifically, the biometric sensor 105 acquires a fingerprint image through the fingerprint sensor 107 and acquires a palm vein image through the vein sensor 108. The authentication quality determining unit 10 determines whether an authentication feature may be extracted from each of the biometric information elements (operation S12). Specifically, the authentication quality determining unit 10 determines whether an authentication feature may be extracted from each of the fingerprint image and the palm vein image acquired in operation S11. For example, when the area of the biometric information acquired in operation S11 is at or above a predetermined value, it may be determined that an authentication feature may be extracted.

When "Yes" is determined in operation S12, the authentication feature extracting unit 30 extracts an authentication feature from each of the biometric information elements (operation S13). Specifically, the authentication feature extracting unit 30 extracts an authentication feature from each of the fingerprint image and the palm vein image. Then, the supplemental quality determining unit 20 determines whether there is a combination of biometric information elements from which supplemental features may be extracted (operation S14). Specifically, when a supplemental feature may be extracted from the fingerprint image and a supplemental feature may be extracted from the palm vein image, the supplemental quality determining unit 20 determines that there is a combination of biometric information elements from which supplemental features may be extracted. In operation S14, in addition to the above-described determination, the supplemental quality determining unit 20 may determine whether a combined feature may be extracted from the supplemental features.

When "Yes" is determined in operation S14, the supplemental feature extracting unit 40 extracts a supplemental feature from each of the biometric information elements (operation S15). Specifically, the supplemental feature extracting unit 40 extracts a supplemental feature from each of the fingerprint image and the palm vein image. Then, the combined feature extracting unit 50 extracts a combined feature by combining the supplemental features (operation S16). Then, the comparing unit 210 functions as an authentication unit. Specifically, the comparing unit 210 compares the combined feature extracted in operation S16 against the combined features in the registered data. The comparing unit 210 compares the authentication feature extracted in operation S13 against the authentication features in the registered data and calculates a matching score (operation S17). In the flowchart illustrated in FIG. 16, supplemental authentication using a combined feature and personal authentication using an authentication feature are simultaneously performed.

The matching score in operation S17 is calculated on the basis of the degree of agreement (degree of similarity) between the authentication feature in the input data and each of the authentication features in the registered data and the degree of agreement (degree of similarity) between the combined feature in the input data and the combined features in the registered data. For example, the matching score may be the sum of the degree of agreement in the authentication feature and the degree of agreement in the combined feature. Examples of the degree of agreement in the authentication feature include the degree of agreement in a pattern of a fingerprint image, that in a positional relationship of minutiae of a fingerprint, and that in a pattern of a palm vein image. Examples of the degree of agreement in the combined feature include the degree of agreement in the ridge pattern of a fingerprint, that in the type of a finger, and that in the length of a finger.

Then, the comparing unit 210 determines whether the matching score of the registered data element having the highest matching score acquired in the comparison in operation S17 is at or above a predetermined threshold value (operation S18). When "Yes" is determined in operation S18, the comparing unit 210 identifies the user to be authenticated as the user corresponding to the registered data element having the highest matching score acquired in the comparison in operation S17 and transmits the result of the identification to the authentication result output unit 70. The authentication result output unit 70 outputs a result that the authentication is successful (operation S19). When "No" is determined in operation S12 or in operation S18, the authentication result output unit 70 outputs a result that the authentication is unsuccessful (operation S20). After operation S19 or operation S20, the process illustrated in the flowchart is completed.

With the biometric authentication process according to the present embodiment, a combined feature is extracted from supplemental features extracted from a plurality of different biometric information elements. Each of the plurality of different biometric information elements includes a feature unique to the user. Accordingly, when a combined feature extracted from a plurality of different biometric information elements is used, the reliability of authentication is improved, in comparison with the case in which a combined feature extracted from the same biometric information is used. Additionally, the use of both an authentication feature and a combined feature in personal authentication may improve the reliability of the authentication.

Extraction of a combined feature from a plurality of different biometric information elements tends to be more difficult than extraction of a combined feature from a plurality of biometric information elements of the same kind. For example, when a contact type fingerprint sensor is used in acquiring a fingerprint and a non-contact type vein sensor is used in acquiring information on a palm vein, the coincidence between the timing of acquiring satisfactory biometric information for use in authentication on the fingerprint and that on the palm vein is difficult. Typical two situations in this case are described below.

1) Where a satisfactory fingerprint and an unsatisfactory palm vein information are acquired:

when the force to a fingertip is strong, the fingerprint tends to be satisfactory. At this time, however, the palm is moved downward or upward, so the palm is hard to be maintained horizontally. As a result, the acquired palm vein information is difficult to be satisfactory.

2) Where an unsatisfactory fingerprint and a satisfactory palm vein information are acquired:

when a user is relaxing and the palm is maintained substantially horizontally, the acquired palm vein information tends to be satisfactory. At this time, however, the force to the fingertip is weak. As a result, a satisfactory fingerprint is hard to be acquired.

Even in the above case, in the present embodiment, the use of a supplemental quality determining process having a determination criterion lower than that in an authentication quality determining process enables selection of a fingerprint image and a palm vein image from which a combined feature may be extracted, thus resulting in stable extraction of a combined feature.

The flowchart illustrated in FIG. 16 deals with one-to-N authentication. Alternatively, it may deal with one-to-one authentication. In this case, when the matching score acquired in operation S17 is at or above a threshold value, it may be determined that the user to be authenticated is the user of the registered data.

Figure 18:
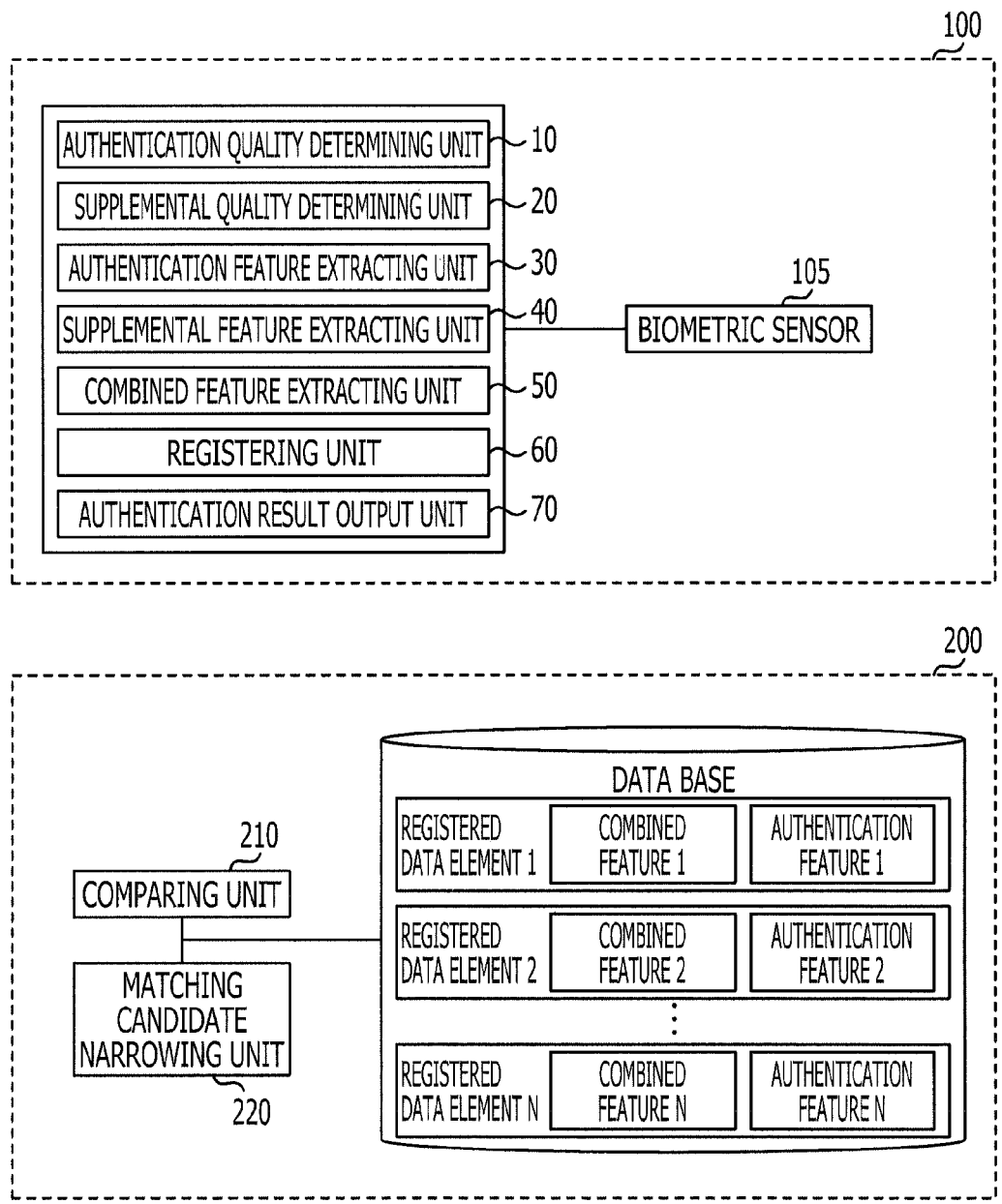
FIG. 18 is a block diagram of functions performed by execution of a biometric information processing program according to a second embodiment.

A second embodiment is described below. FIG. 18 is a block diagram of functions performed by execution of a biometric information processing program according to the second embodiment. The execution of the biometric information processing program implements the authentication quality determining unit 10, the supplemental quality determining unit 20, the authentication feature extracting unit 30, the supplemental feature extracting unit 40, the combined feature extracting unit 50, the registering unit 60, and the authentication result output unit 70. The execution of the comparing program stored in the storage apparatus 203 implements the comparing unit 210 and a matching candidate narrowing unit 220.

Figure 19:
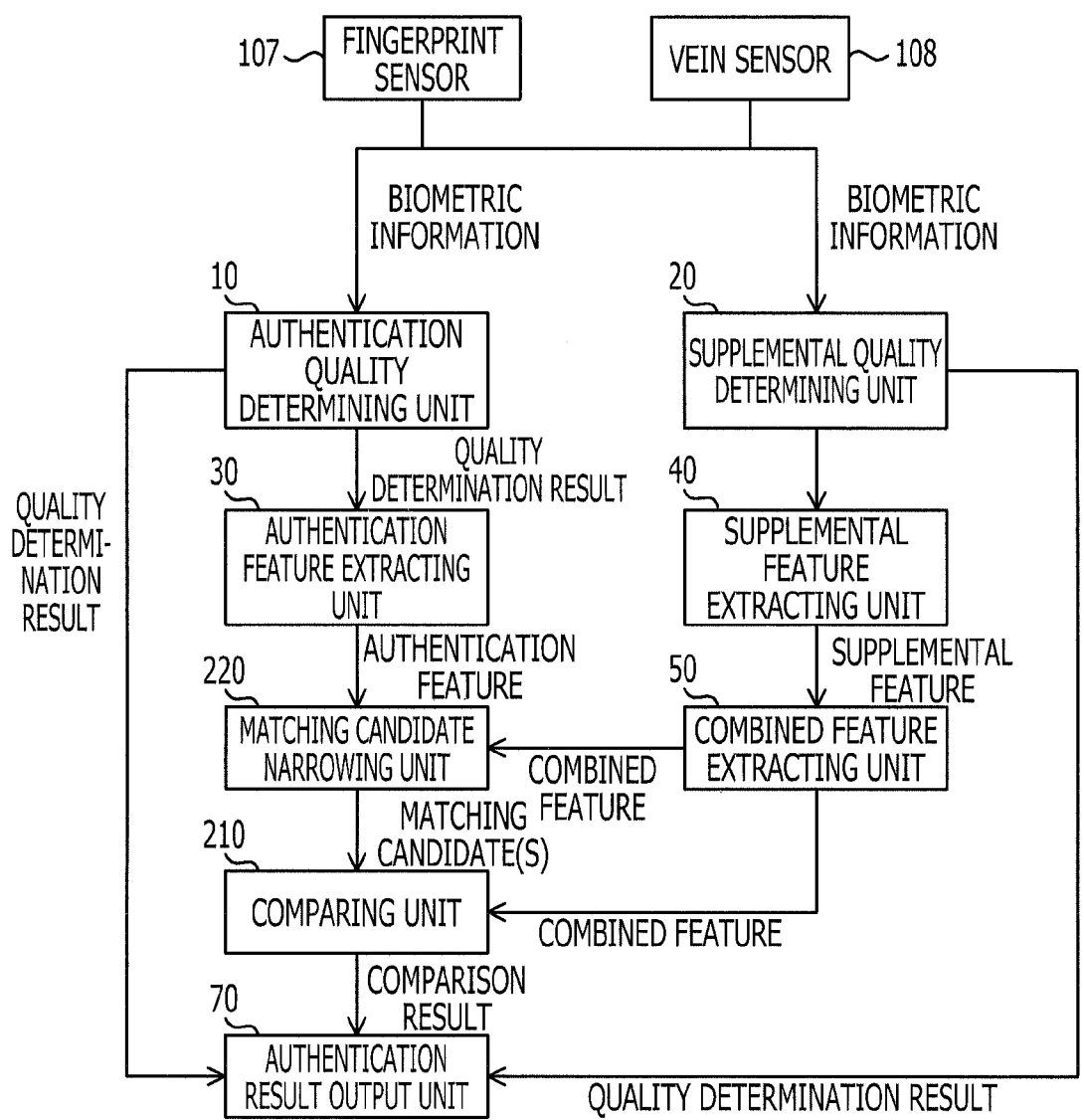
FIG. 19 is a block diagram of functions performed in execution of a biometric authentication process.
Figure 20:
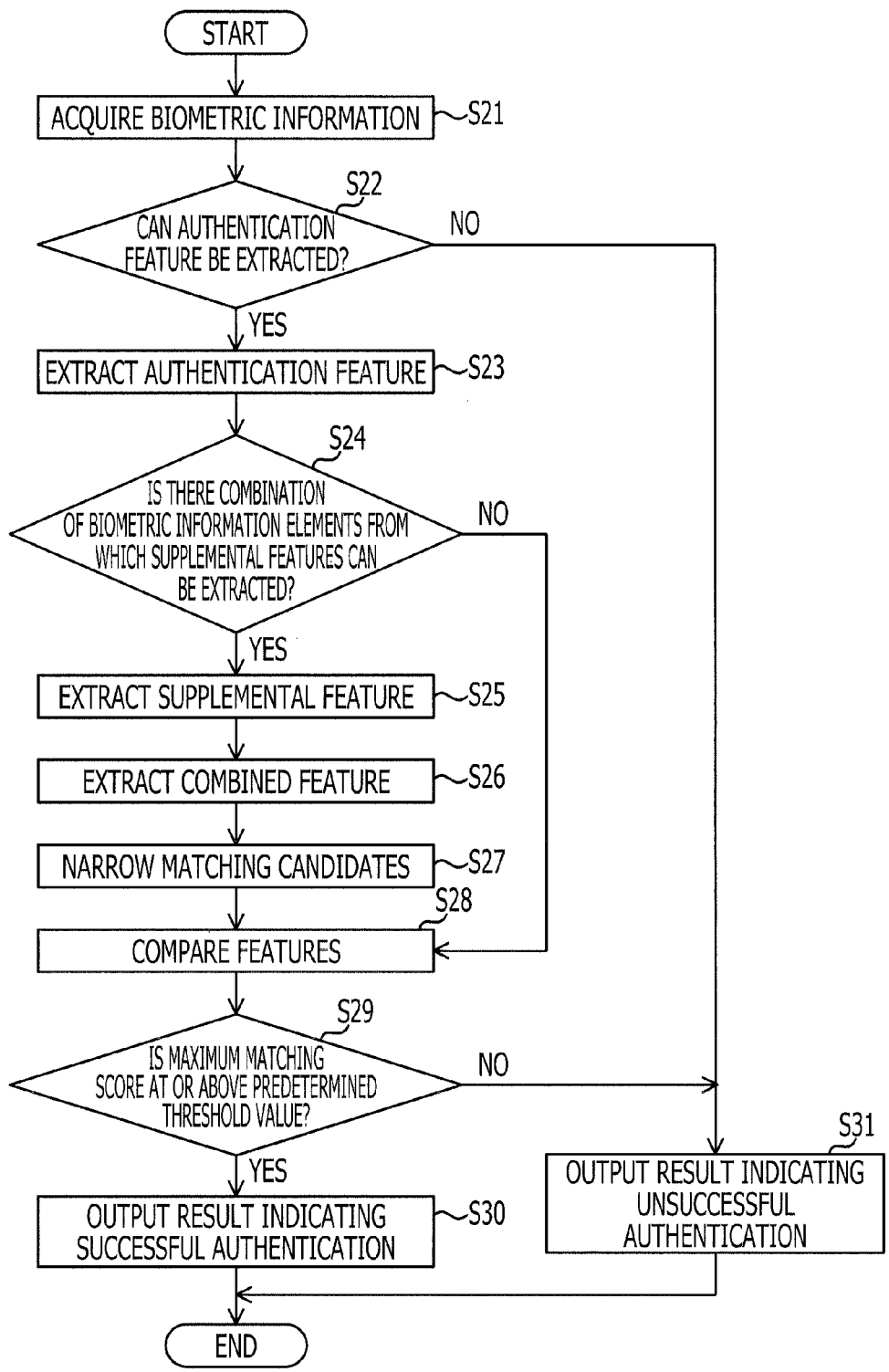
FIG. 20 illustrates an example of a flowchart of the biometric authentication process.

The biometric data registering process is substantially the same as that in the first embodiment. In the biometric authentication process, the matching candidate narrowing unit 220 narrows users of matching candidates. The biometric authentication process according to the present embodiment is described below. FIG. 19 is a block diagram of functions performed in the biometric authentication process. FIG. 20 illustrates an example of a flowchart of the biometric authentication process. An example of the biometric authentication process is described below with reference to FIGS. 19 and 20. Operations S21 to S26 are substantially the same as operations S11 to S16 in FIG. 16. After operation S26, the matching candidate narrowing unit 220 narrows users of matching candidates (operation S27).

The matching candidate narrowing unit 220 excludes a user in which the degree of agreement between the combined feature in input data and each of the combined features in the registered data is less than a threshold value from the matching candidates. For example, when the combined feature is the ridge pattern of a fingerprint, the matching candidate narrowing unit 220 excludes a user in which the degree of agreement between the ridge pattern of the fingerprint in the input data and each of the ridge patterns of the fingerprints in the registered data is lower than a threshold value from the matching candidates. When the combined feature is the finger type, the matching candidate narrowing unit 220 excludes a user, in which the finger type in the input data does not match with the finger type in the registered data from the matching candidates. Alternatively, when a plurality of fingerprint images are acquired from a plurality of fingers, a user in which the types of a predetermined number of fingers match may be selected as a matching candidate. When the combined feature is the length of a finger, the matching candidate narrowing unit 220 excludes a user in which the degree of agreement calculated from the ratio between the length of the finger in the input data and each of the lengths of the fingers in the registered data, the difference therebetween, or the like is less than a threshold value from the matching candidates. Alternatively, the matching candidate narrowing unit 220 may select, as the matching candidates, a predetermined number of users from the top when the registered data elements are arranged in descending order of their degrees of agreement between the combined feature in the input data and the combined features in the registered data elements.

Figure 21:
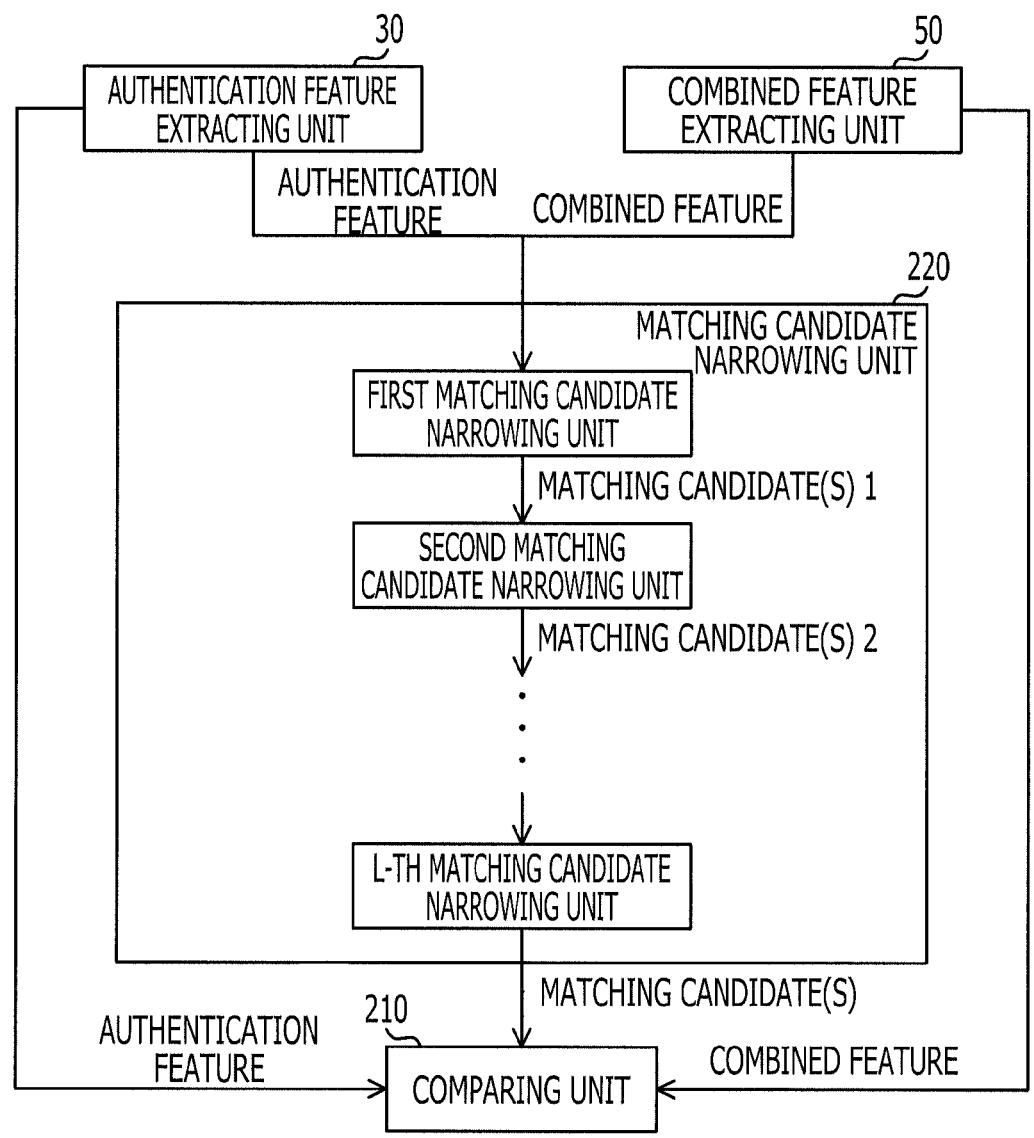
FIG. 21 is a block diagram that illustrates another example of a matching candidate narrowing unit.

FIG. 21 is a block diagram that illustrates another example of the matching candidate narrowing unit 220. With reference to FIG. 21, the matching candidate narrowing unit 220 may function as a plurality of matching candidate narrowing units. For example, an authentication feature and a combined feature may not be extracted at the same time. There may be a difference between the extraction times. The matching candidate narrowing unit 220 may narrow matching candidates using a feature that is first extracted, and may further narrow the matching candidates using a feature that is then extracted. In this way, the plurality of matching candidate narrowing units may sequentially narrow matching candidates using extracted features.

With reference again to FIG. 20, operations S28 to S31 are substantially the same as operations S17 to S20 in FIG. 16. After operation S30 or operation S31, the process illustrated in the flowchart is completed.

With the biometric authentication process according to the present embodiment, personal authentication using both an authentication feature and a combined feature may be performed. This enables the reliability of authentication to be improved. Matching candidates may be narrowed. This enables the time involved in authentication to be reduced and the authentication accuracy to be improved.

A third embodiment is described below. For the third embodiment, an example in which it is determined using a combined feature whether an authentication feature may be extracted.

Figure 22:
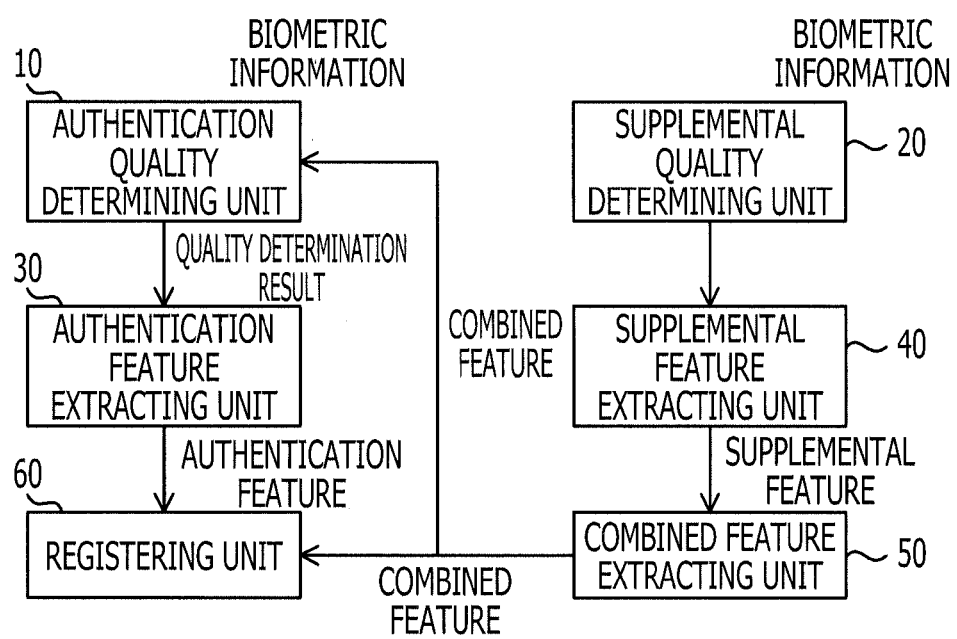
FIG. 22 is a block diagram of functions performed in a biometric data registering process.
Figure 23:
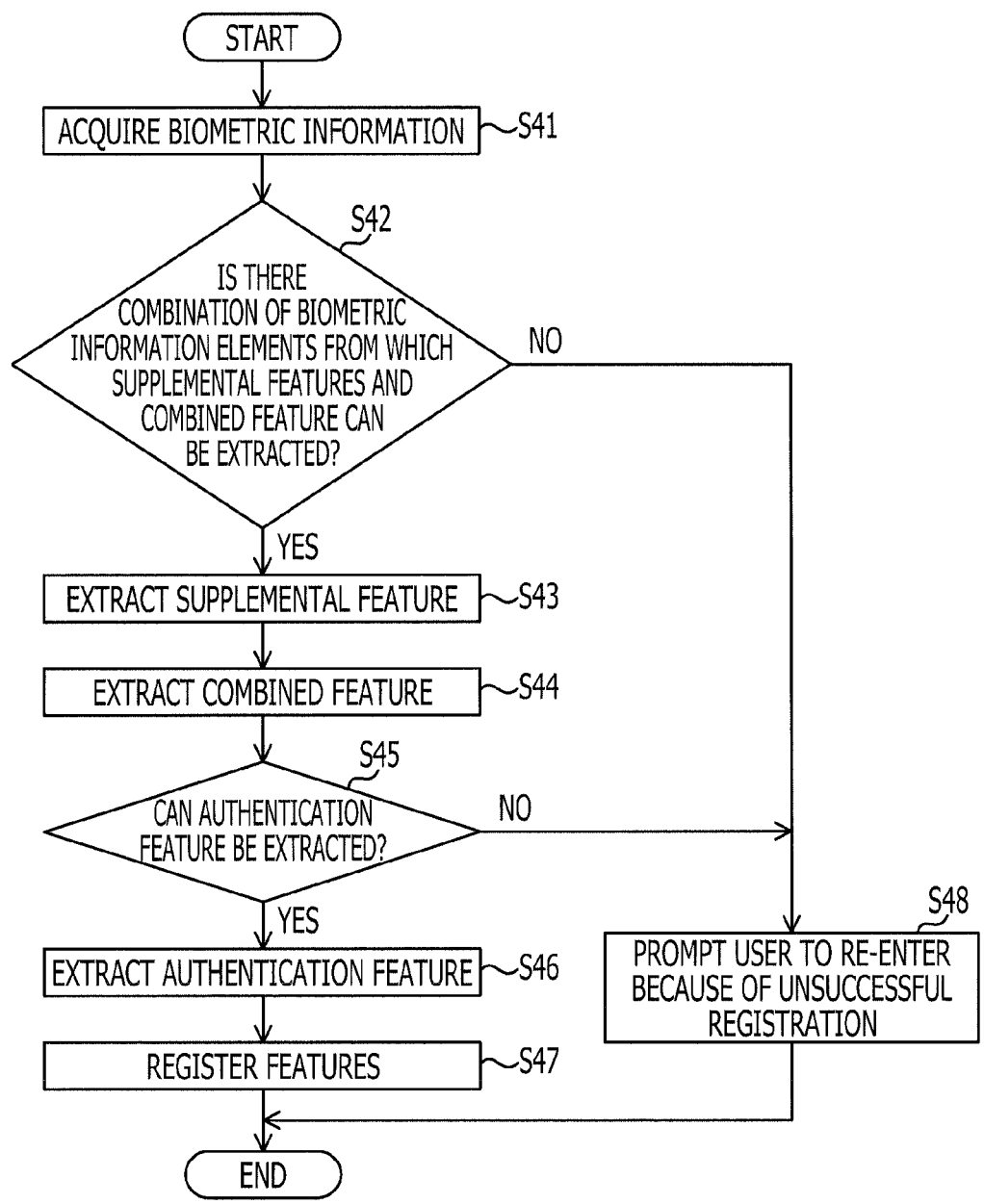
FIG. 23 illustrates an example of a flowchart of the biometric data registering process.

A biometric data registering process is described below. FIG. 22 is a block diagram of functions performed in the biometric data registering process. FIG. 23 illustrates an example of a flowchart of the biometric data registering process. An example of the biometric data registering process is described below with reference to FIGS. 22 and 23.

The biometric sensor 105 acquires a plurality of different biometric information elements about a new user (operation S41). Specifically, the biometric sensor 105 acquires a fingerprint image through the fingerprint sensor 107 and acquires a palm vein image through the vein sensor 108. The supplemental quality determining unit 20 determines whether there is a combination of biometric information elements from which supplemental features and a combined feature may be extracted (operation S42).

When "Yes" is determined in operation S42, the supplemental feature extracting unit 40 extracts a supplemental feature from each of the biometric information elements (operation S43). Specifically, the supplemental feature extracting unit 40 extracts a supplemental feature from each of the fingerprint image and the palm vein image. Then, the combined feature extracting unit 50 extracts a combined feature by combining the supplemental features (operation S44).

Then, the authentication quality determining unit 10 determines whether an authentication feature may be extracted using the combined feature extracted in operation S44 (operation S45). For example, when the entire fingerprint image is used as a supplemental feature and a range in which the fingerprint of each finger is estimated to be present is extracted as a combined feature, the authentication quality determining unit 10 may determine the quality of the fingerprint image in the estimated range.

When "Yes" is determined in operation S45, the authentication feature extracting unit 30 extracts an authentication feature from each of the biometric information elements (operation S46). For example, the authentication feature extracting unit 30 may extract an authentication feature by cutting a portion of the fingerprint image in the above-described estimated range. Then, the registering unit 60 registers the authentication feature acquired from each biometric information element and the combined feature in association with the ID of the new user in the database as registered data (operation S47). After that, the process illustrated in the flowchart is completed.

When "No" is determined in operation S42 or operation S43, the display apparatus 104 displays information prompting the user to re-enter biometric information or the like (operation S48). After operation S48, the process illustrated in the flowchart is completed.

Figure 24:
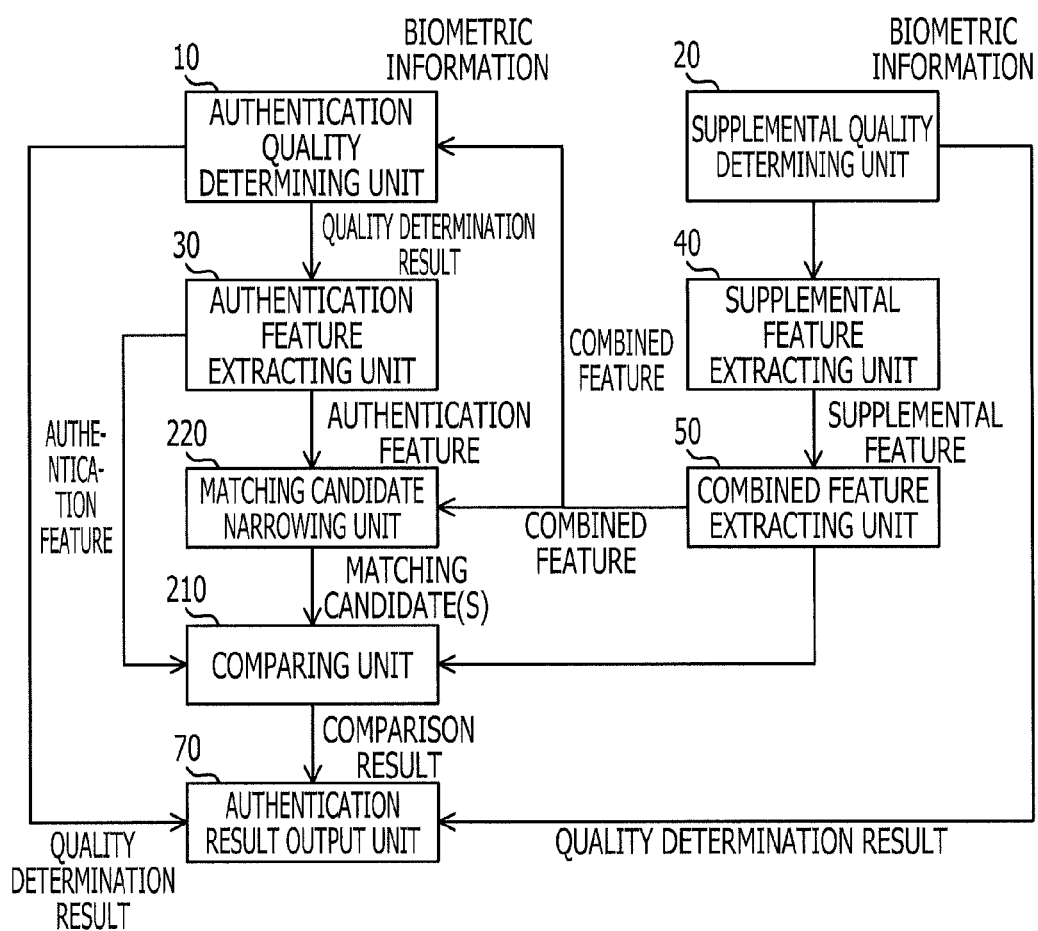
FIG. 24 is a block diagram of functions performed in execution of a biometric authentication process.
Figure 25:
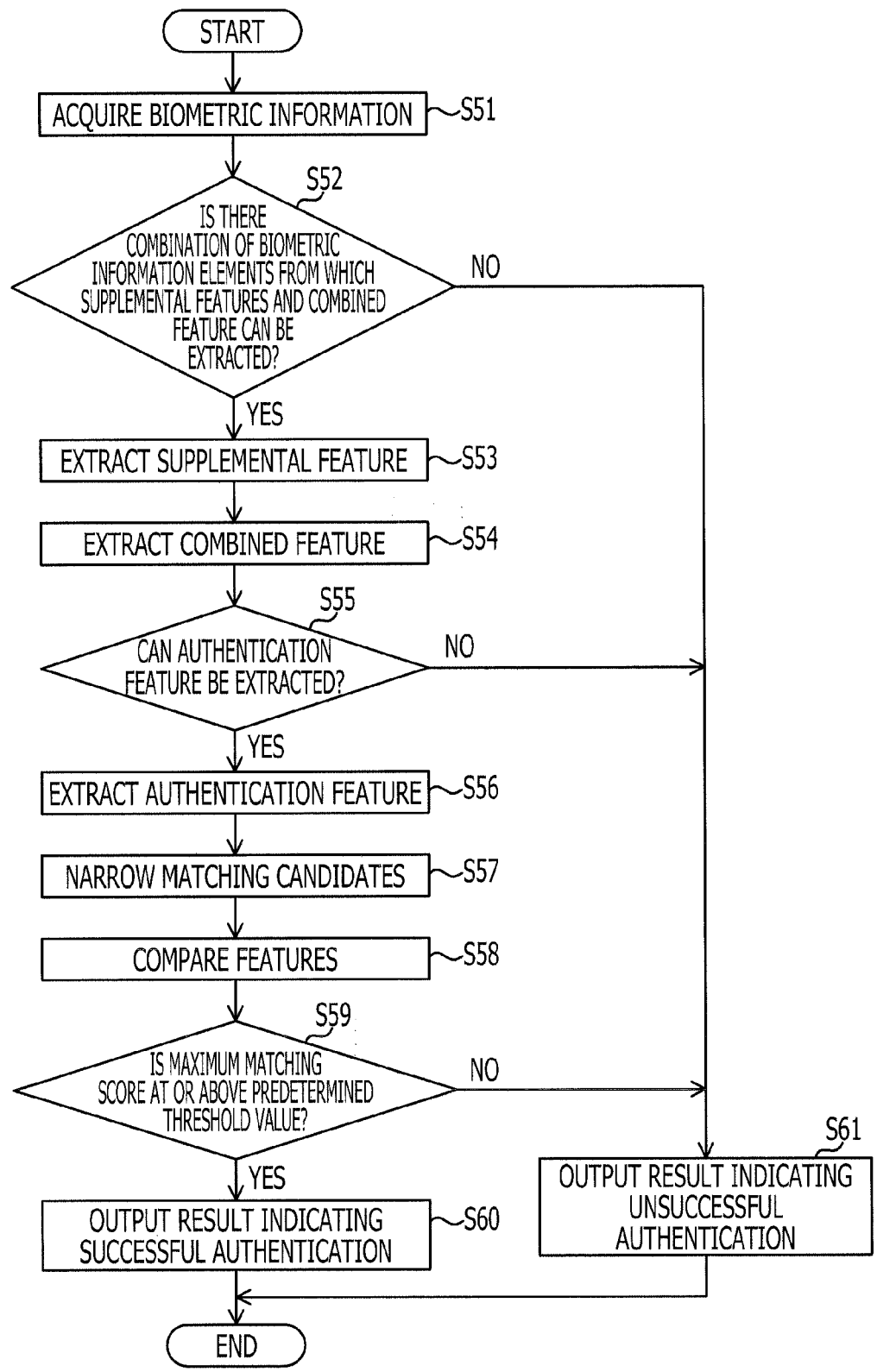
FIG. 25 illustrates an example of a flowchart of the biometric authentication process.

The biometric authentication process is described below. FIG. 24 is a block diagram of functions performed in the biometric authentication process. FIG. 25 illustrates an example of a flowchart of the biometric authentication process. With reference to FIG. 25, operations S51 to S56 are substantially the same as operations S41 to S46 in FIG. 23. Operations S57 to S61 are substantially the same as operations S27 to S31 in FIG. 20. After operation S60 or operation S61, the process illustrated in the flowchart is completed.

With the present embodiment, a combined feature may be used in the authentication quality determining unit 10. This enables the quality determination to be improved.

Figure 26:
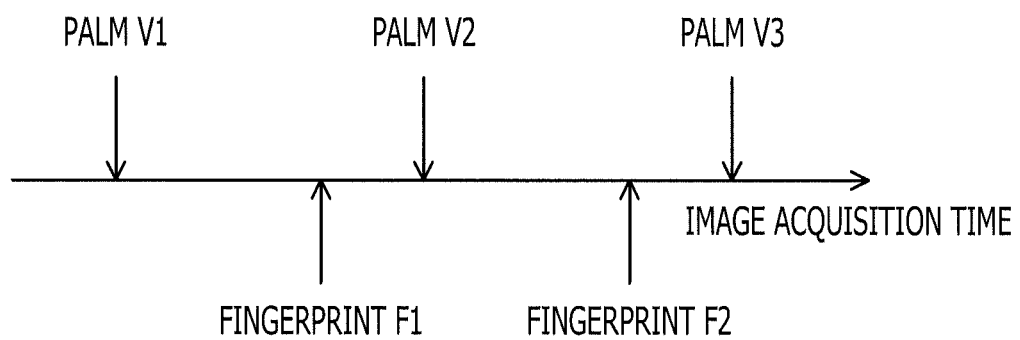
FIG. 26 illustrates timings of acquiring biometric information elements.

A fourth embodiment is described below. The biometric sensor may acquire biometric information elements at predetermined time intervals. In this case, in acquiring a plurality of biometric information elements, they may be acquired at different times. For example, with reference to FIG. 26, after a predetermined time elapses from the acquisition of a palm image V1, a palm image V2 is acquired. Then, after a predetermined time elapses, a palm image V3 is acquired. A fingerprint image F1 is acquired between the time of the acquisition of the palm image V1 and that of the palm image V2. A fingerprint image F2 is acquired between the time of the acquisition of the palm image V2 and that of the palm image V3. The location of the finger may change between the time of the acquisition of the, palm image V2 and that of the next palm image V3. In this case, a combined feature extracted from the fingerprint image F1 and the palm image V2 and a combined feature extracted from the fingerprint image F2 and the palm image V2 may be significantly different from each other.

For example, when the degree of similarity between the fingerprint image F1 and the fingerprint image F2 is high, it may be determined that no finger has been moved. In such a case, when a combined feature is extracted from the palm image V2 and the fingerprint image F1, which was acquired closely in time to the palm image V2, the accuracy of the combined feature may be improved. In the present embodiment, an example in which the accuracy of a combined feature is improved in the case where biometric information elements are acquired at different times is described.

Figure 27:
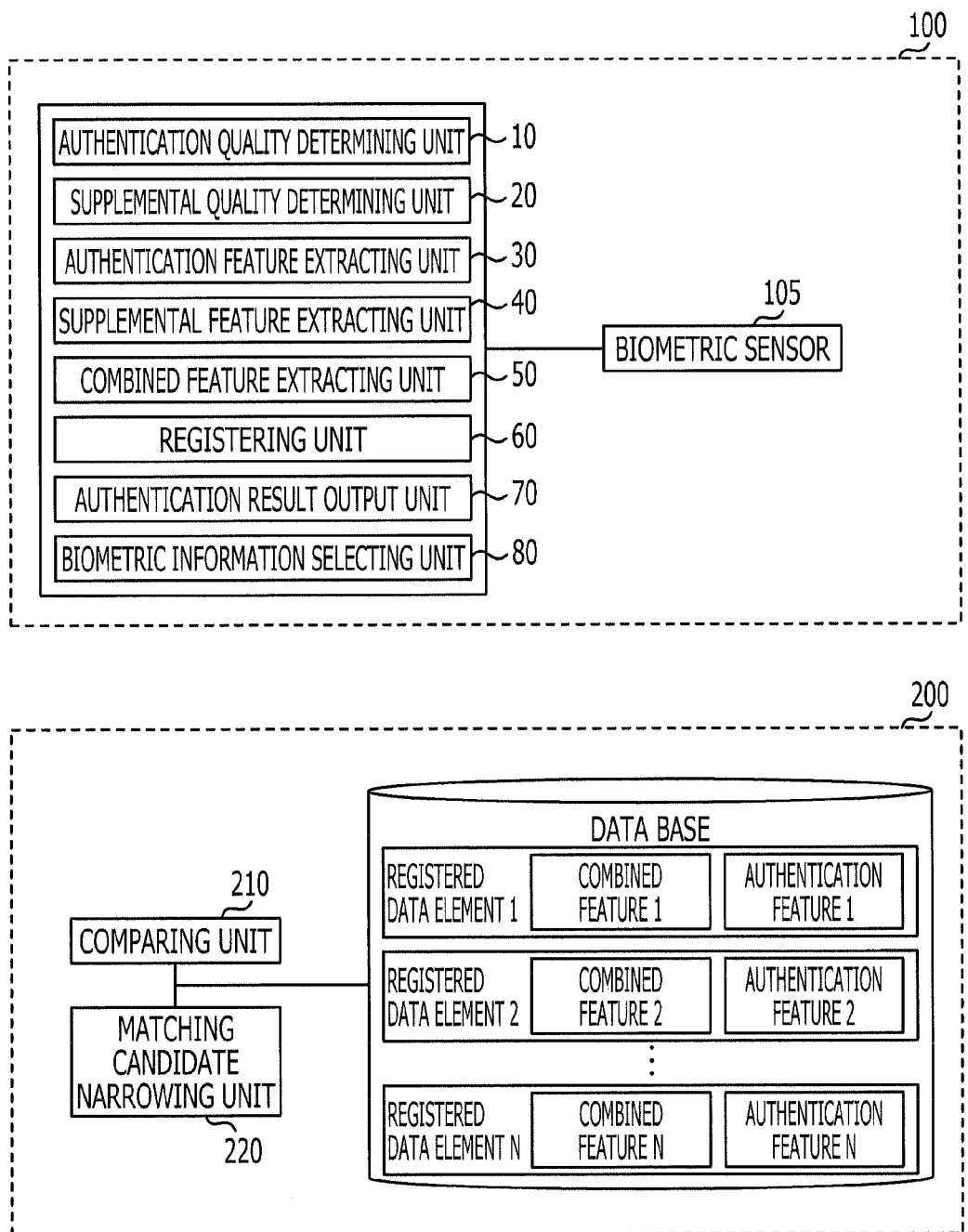
FIG. 27 is a block diagram of functions performed by execution of a biometric information processing program according to a fourth embodiment.

FIG. 27 is a block diagram of functions performed by execution of a biometric information processing program according to the fourth embodiment. With reference to FIG. 27, the execution of the biometric information processing program implements the authentication quality determining unit 10, the supplemental quality determining unit 20, the authentication feature extracting unit 30, the supplemental feature extracting unit 40, the combined feature extracting unit 50, the registering unit 60, the authentication result output unit 70, and a biometric information selecting unit 80. The execution of the comparing program stored in the storage apparatus 203 implements the comparing unit 210 and the matching candidate narrowing unit 220.

Figure 28:
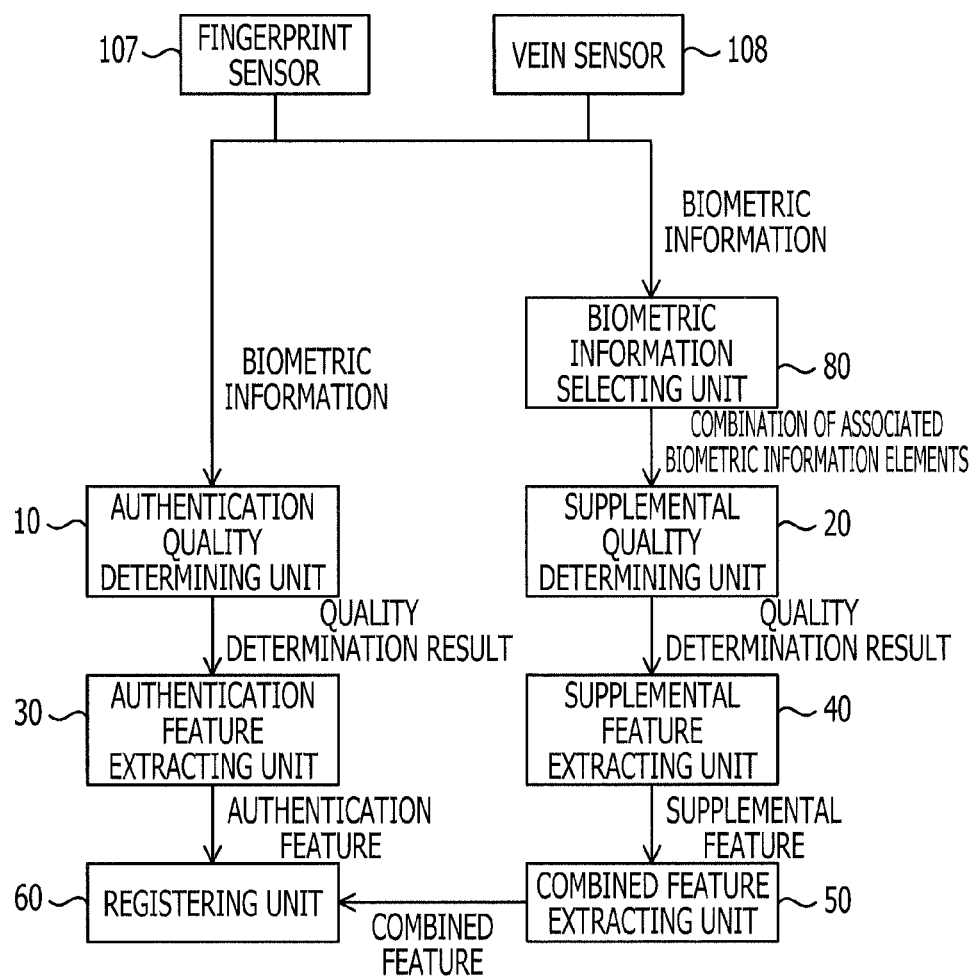
FIG. 28 is a block diagram of functions performed in a biometric data registering process.
Figure 29:
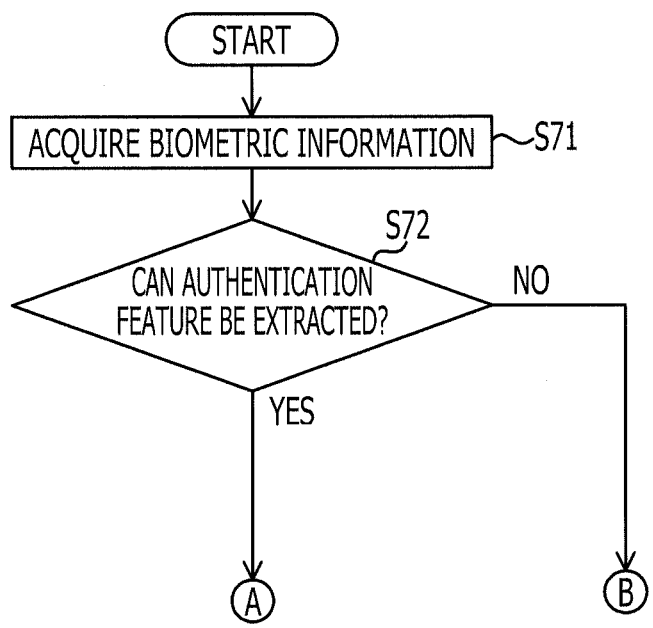
FIG. 29 illustrates an example of a flowchart of the biometric data registering process.
Figure 30:
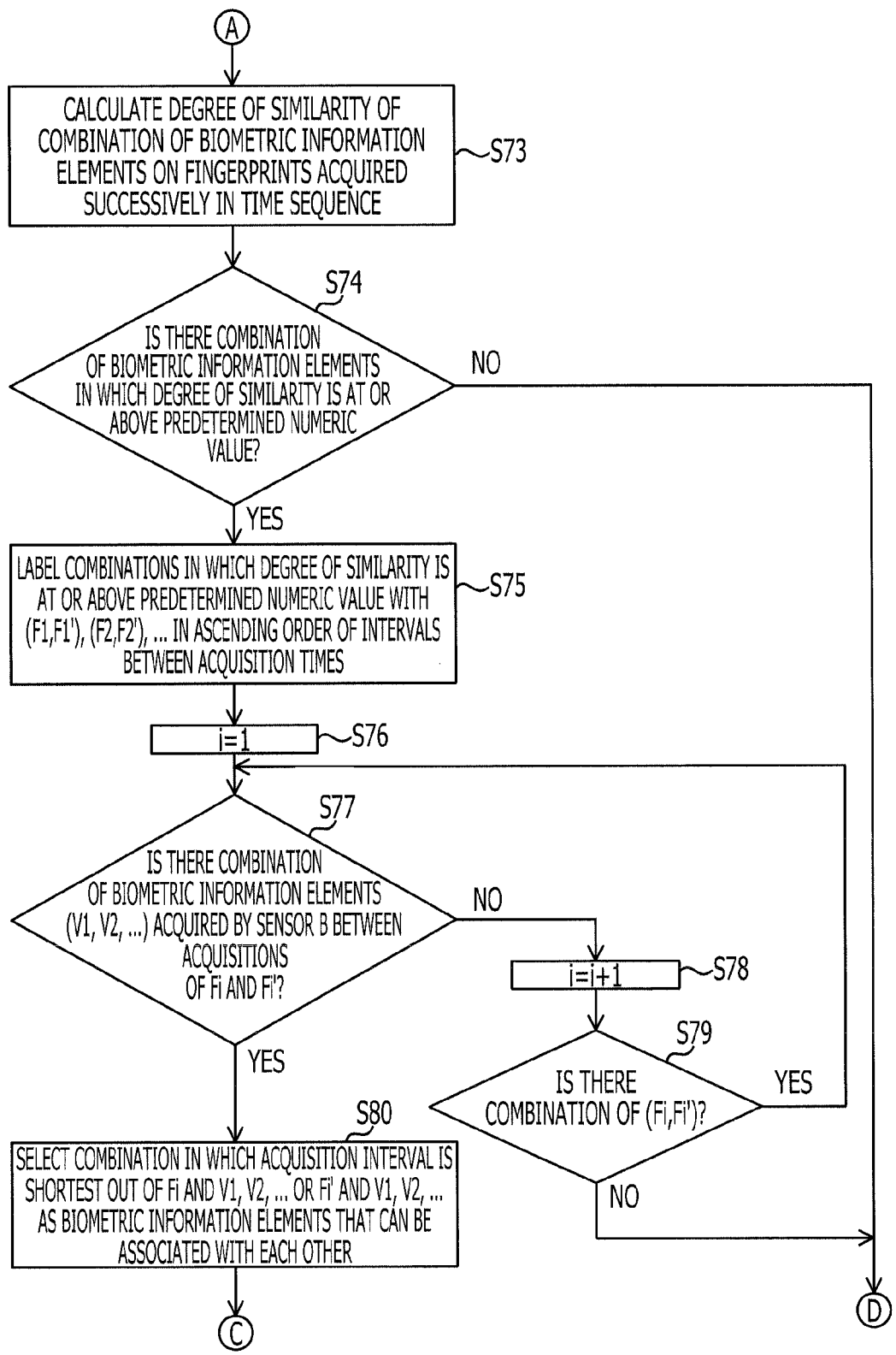
FIG. 30 illustrates the example of the flowchart of the biometric data registering process.
Figure 31:
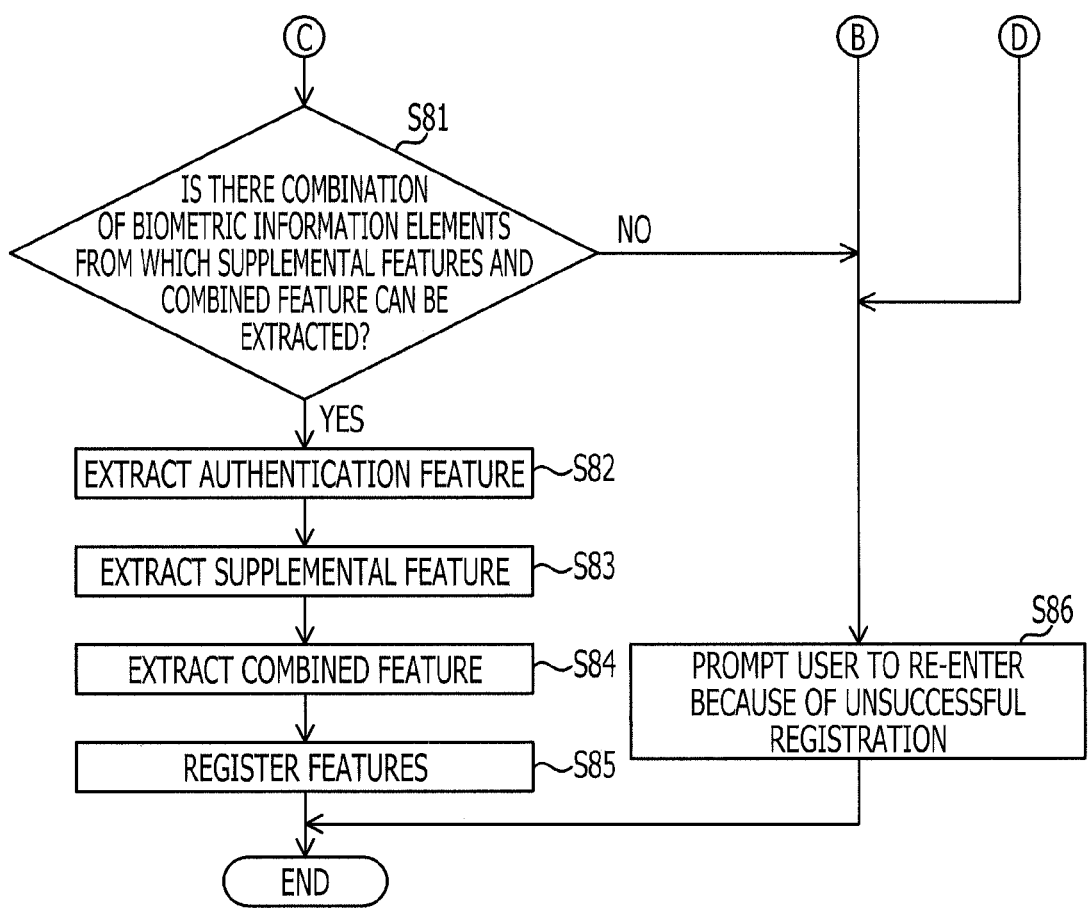
FIG. 31 illustrates the example of the flowchart of the biometric data registering process.

A biometric data registering process is described below. FIG. 28 is a block diagram of functions performed in the biometric data registering process. FIGS. 29 to 31 illustrate an example of a flowchart of the biometric data registering process. An example of the biometric data registering process is described below with reference to FIGS. 28 to 31.

The biometric sensor, 105 sequentially acquires a plurality of different biometric information elements about a, new user at predetermined time intervals (operation S71). Specifically, the biometric sensor 105 sequentially acquires fingerprint images through the fingerprint sensor 107 at predetermined time intervals and sequentially acquires palm vein images through the vein sensor 108 at predetermined time intervals. The authentication quality determining unit 10 determines whether an authentication feature may be extracted from each of the biometric information elements (operation S72). Specifically, the authentication quality determining unit 10 determines whether an authentication feature may be extracted from each of the fingerprint images and the palm vein images acquired in operation S71. For example, when the area of the biometric information acquired in operation S71 is at or above a predetermined value, it may be determined that an authentication feature may be extracted.

When "Yes" is determined in operation S72, the biometric information selecting unit 80 calculates the degree of similarity of a combination of one kind of biometric information elements (e.g., fingerprint biometric information elements) acquired in succession in time sequence (operation S73). Then, the biometric information selecting unit 80 determines whether there is a combination in which the degree of similarity is at or above a predetermined numeric value (operation S74). When "Yes" is determined in operation S74, the biometric information selecting unit 80 labels combinations in which the degree of similarity is at or above the predetermined value with, for example, (F1,F1'), (F2,F2'), ... in ascending order of their intervals between the acquisition times (operation S75). Then, the biometric information selecting unit 80 substitutes "1" for the variable "i" (operation S76).

Then, the biometric information selecting unit 80 determines whether there are another kind of biometric information elements V1, V2, ... (e.g., palm vein biometric information elements) acquired between the acquisition of Fi and the acquisition of Fi' (operation S77). When "No" is determined in operation S77, the biometric information selecting unit 80 substitutes "i+1" for the variable "i" (operation S78). Then, the biometric information selecting unit 80 determines whether there is a combination of (Fi,Fi') (operation S79). When "Yes" is determined in operation S79, operation S77 is executed again.

When "Yes" is determined in operation S77, the biometric information selecting unit 80 selects the combination in which the acquisition interval is the shortest from Fi and V1, V2, ... or Fi' and V1, V2, ... as biometric information elements that may be associated with each other (operation S80).

Then, the supplemental quality determining unit 20 determines whether a supplemental feature and a combined feature may be extracted from the combination of the biometric information elements selected in operation S80 (operation S81). When "Yes" is determined in operation S81, operations S82 to S85 are executed. Operations S82 to S85 are substantially the same as operations S4 to S7 in FIG. 4.

When "No" is determined in operation S72, S74, S77, or S81, the display apparatus 104 displays information prompting the user to re-enter biometric information or the like (operation S86). After operation S86, the process illustrated in the flowchart is completed.

Figure 32:
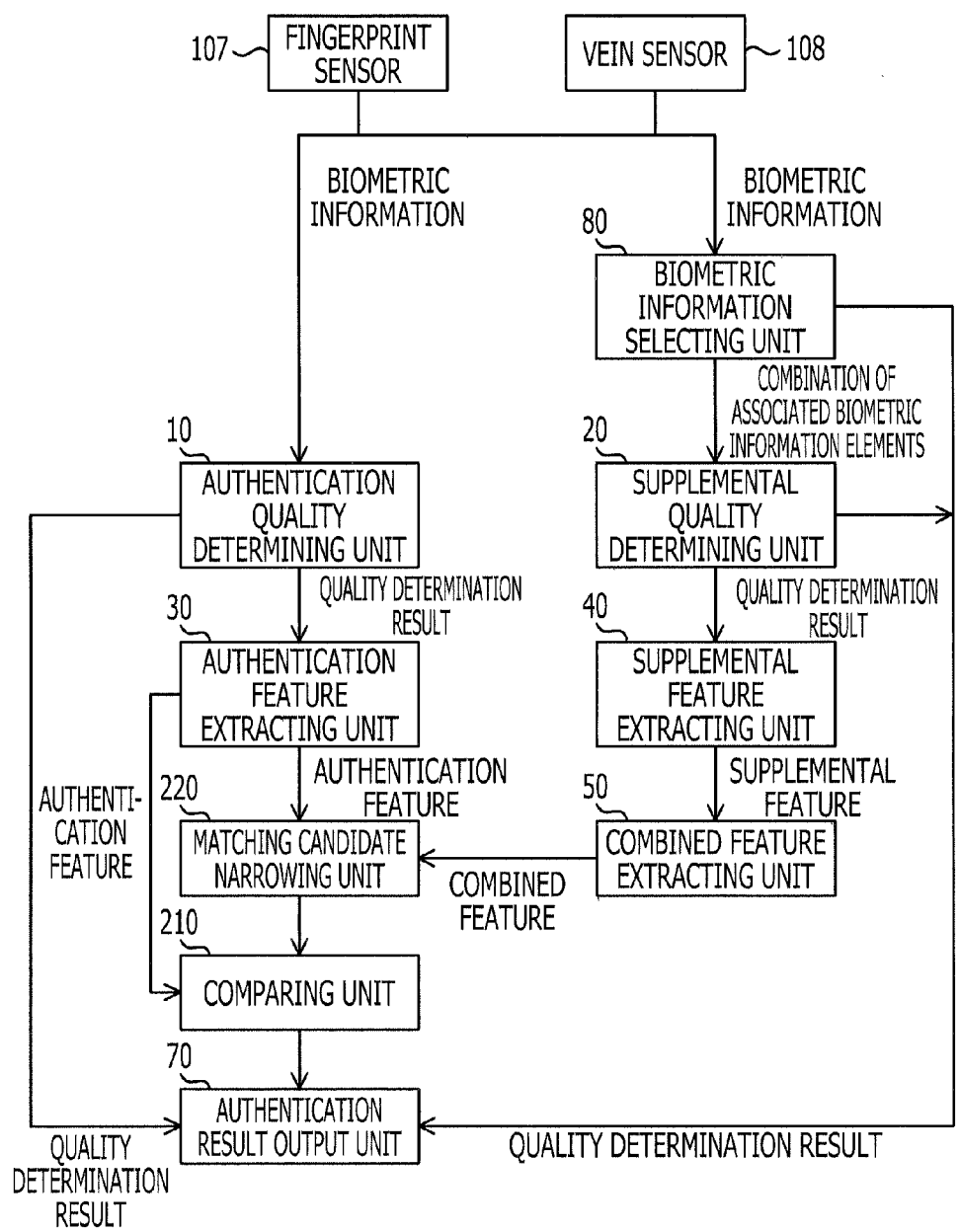
FIG. 32 is a block diagram of functions performed in a biometric authentication process.
Figure 33:
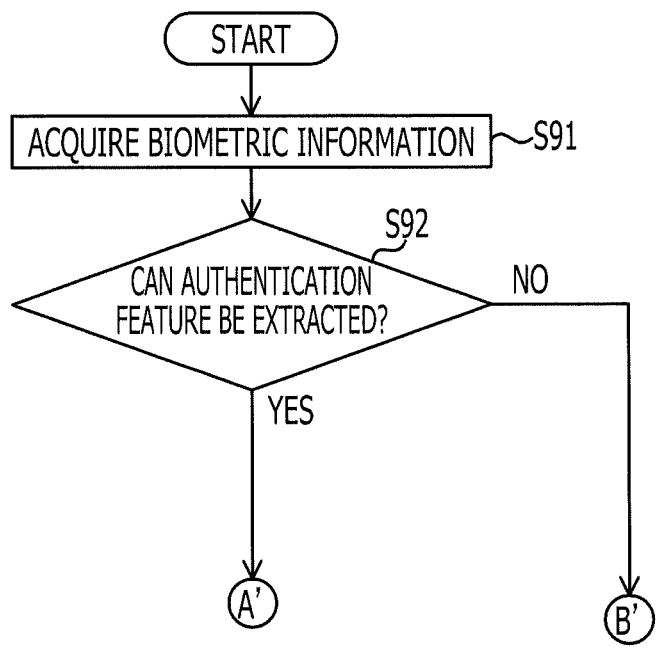
FIG. 33 illustrates an example of a flowchart of the biometric authentication process.
Figure 34:
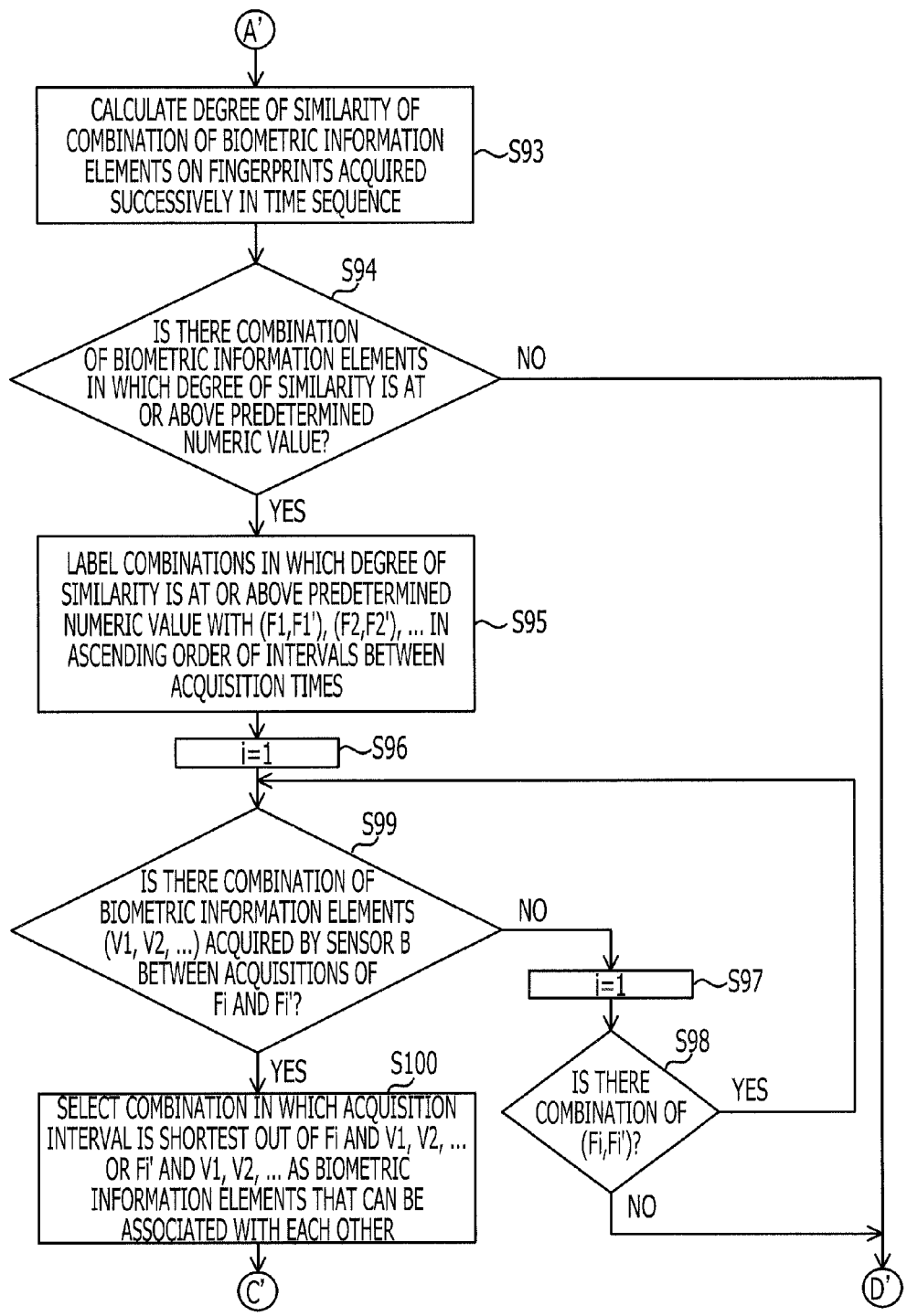
FIG. 34 illustrates the example of the flowchart of the biometric authentication process.
Figure 35:
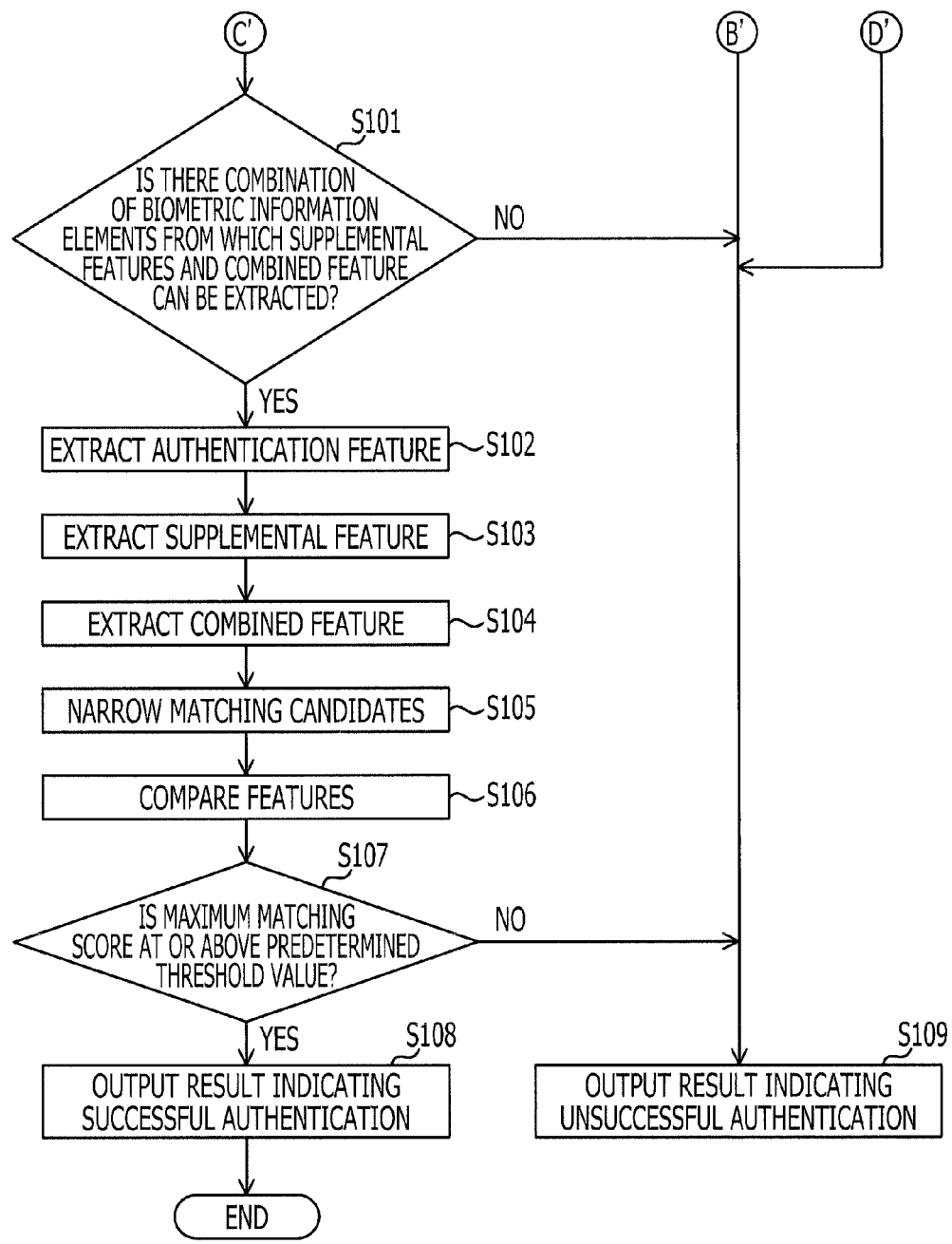
FIG. 35 illustrates the example of the flowchart of the biometric authentication process.

A biometric authentication process is described below. FIG. 32 is a block diagram of functions performed in the biometric authentication process. FIGS. 33 to 35 illustrate an example of a flowchart of the biometric authentication process. Operations S91 to S104 are substantially the same as operations S71 to S84 in FIG. 31. Operations S105 to S109 are substantially the same as operations S27 to S31 in FIG. 20.

With the present embodiment, a combined feature with high accuracy may be extracted from a biometric component having a small displacement. The use of the combined feature with high accuracy enables the authentication accuracy to be improved.

Figure 36A:
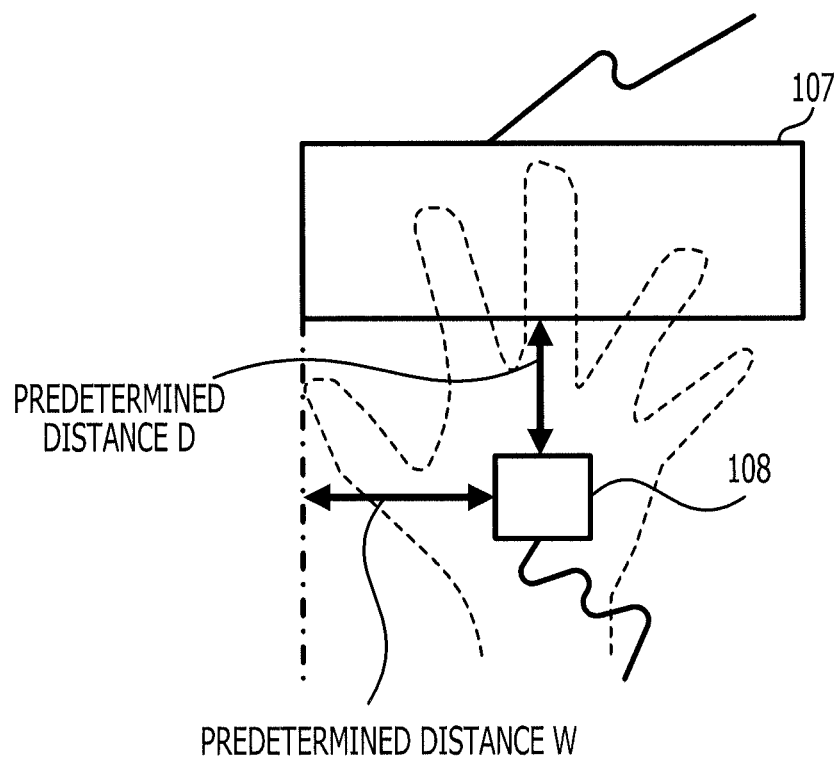
FIGS. 36A and 36B illustrate fixation of a fingerprint sensor and a vein sensor.
Figure 36B:
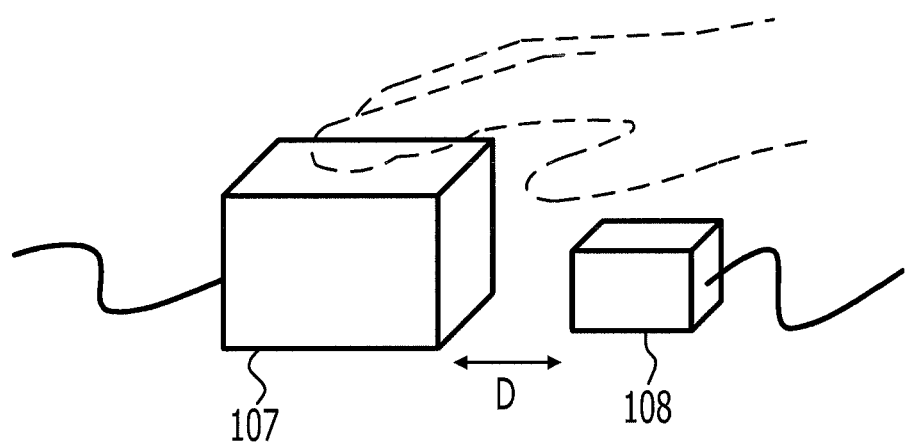

A fifth embodiment is described below. Preferably, the positional relationship between the biometric sensors may be fixed in acquiring a plurality of different biometric information elements. For example, with reference to FIGS. 36A and 36B, the distance between the fingerprint sensor 107 and the vein sensor 108 may preferably be fixed. In the example illustrated in FIGS. 36A and 36B, the fingerprint sensor 107 and the vein sensor 108 are fixed at the distance D. The biometric sensor 105 according to the present embodiment is useful particularly in extracting the length of a finger as a combined feature, for example.

Figure 37A:
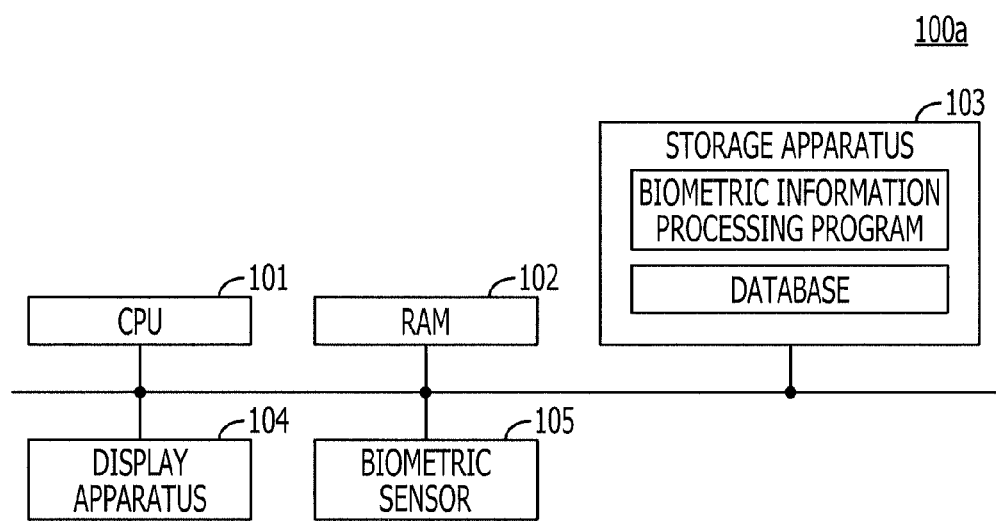
FIG. 37A is a block diagram that illustrates a hardware configuration of a biometric information processing device according to a sixth embodiment.
Figure 37B:
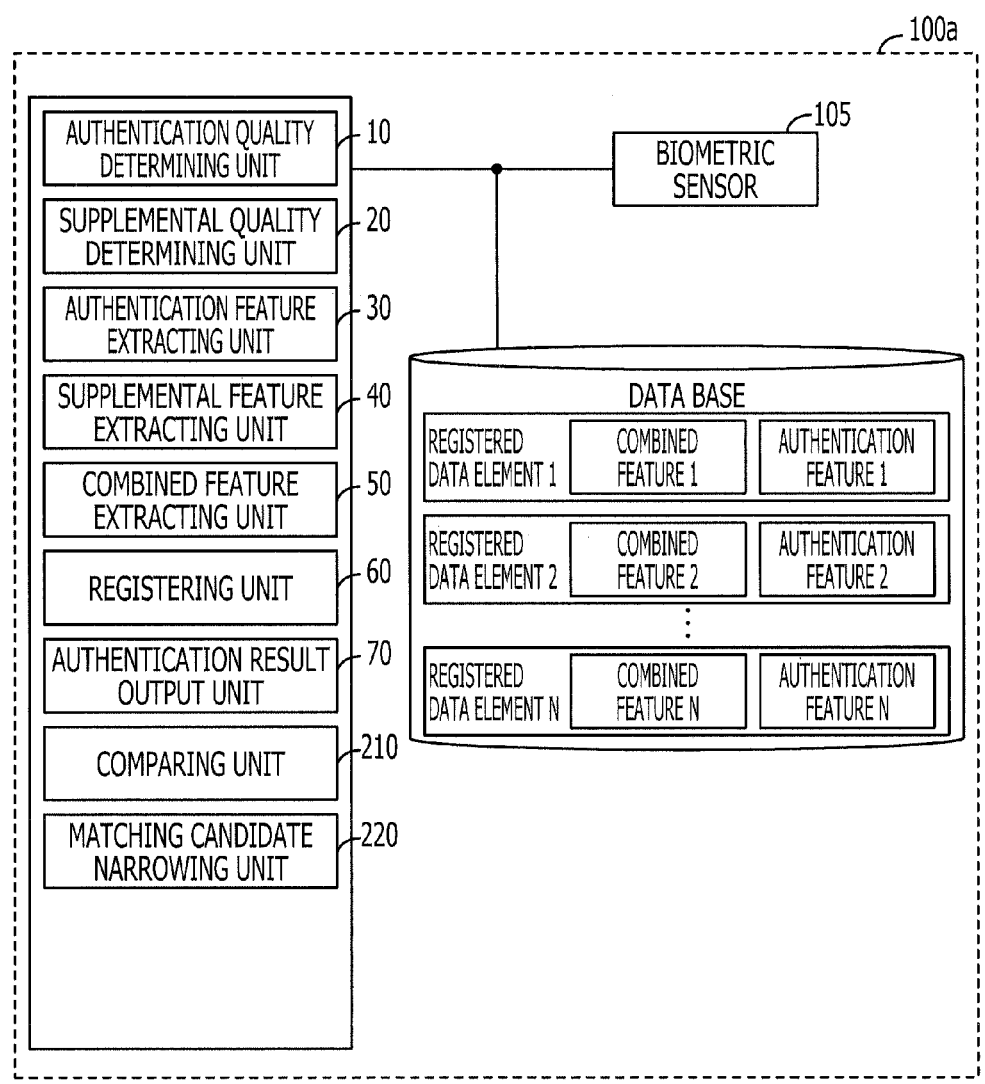
FIG. 37B is a block diagram of functions performed by execution of a biometric information processing program according to the sixth embodiment.

A sixth embodiment is described below. In the above-described embodiments, the comparing unit 210, the matching candidate narrowing unit 220, and the database are implemented in the server 200. Alternatively, they may be implemented in a single computer. FIG. 37A is a block diagram that illustrates a hardware configuration of a biometric information processing device 100a according to the sixth embodiment. In the present embodiment, the database is stored in the storage apparatus 103. The comparing program is incorporated in the biometric information processing program. FIG. 37B is a block diagram of functions performed by execution of the biometric information processing program according to the present embodiment. With reference to FIG. 37B, the comparing unit 210 and the matching candidate narrowing unit 220 are implemented in the biometric information processing device 100a.

Another kind of a combined feature is described below. As the combined feature, a result of determination of whether biometric information acquired by the biometric sensor 105 is valid may be used. For example, when the shape of a finger estimated from a palm vein image and the shape of the finger lying in the direction in which the estimated finger extends do not match, the biometric information acquired by, the biometric sensor 105 is invalid. In such a case, the authentication may be determined to be unsuccessful. For example, a range in which a fingerprint is present may be used as a supplemental feature extracted from a fingerprint image. For example, each of the location of the base of a finger and the direction in which the finger extends in consideration of a difference between the right and left hands may be used as a supplemental feature extracted from a palm image. From these supplemental features, the location of the fingerprint image estimated from the location of the base of the finger and the direction in which the finger extends may be extracted. When the degree of agreement between the estimated location of the fingerprint image and the range in which the fingerprint is present is at or above a threshold value, it may be determined that the fingerprint image acquired by the biometric sensor 105 is valid. This determination result may be used as a combined feature extracted from supplemental features. As the above-described degree of agreement, the ratio of the overlapping area to the range in which the fingerprint is present may be used.

Alternatively, when the angle difference between the "direction in which the finger extends" of the supplemental feature and the "direction in which the finger extends" derived from the supplemental feature extracted from the fingerprint image is at or below a predetermined value, it may be determined that the fingerprint image acquired by the biometric sensor 105 is valid. This determination result may be a combined feature extracted from the supplemental features. FIG. 38A is a table that illustrates supplemental features in this case. FIG. 38B illustrates a combined feature acquired from the supplemental features illustrated in FIG. 38A.

Alternatively, the time at which a fingerprint image is acquired and the time at which a vein image is acquired may be used as supplemental features. For example, when the difference between the acquisition times is at or below a predetermined value, it may be determined that both the fingerprint image and the vein image are captured from the same hand and each of them is an image acquired by valid inputting. This determination result may be a combined feature extracted from the supplemental features. Determining whether the input is valid using the above-described combined feature may achieve the advantage that an invalid input, such as unnatural replacement of a hand or a finger, may be detected and malicious attacks may be reduced.

An improvement in the frequency of extraction of a supplemental feature is described below. When all time differences between acquisitions of a plurality of biometric information elements exceed a predetermined value in the supplemental quality determining unit, supplemental information may be calculated by linear interpolation or linear extrapolation.

For example, when the vein images V1 and V2 and the fingerprint image F1 are input at one input action, if the time difference between the acquisition of the vein image V1 and that of the fingerprint image F1 and the time difference between the acquisition of the vein image V2 and that of the fingerprint image F1 are at or above a predetermined value, supplemental information for the vein corresponding to the time T at which the fingerprint image F1 is input may be calculated by linear interpolation or extrapolation using the time. The supplemental information calculated by interpolation or extrapolation may be calculated from a plurality of fingerprint images. Examples of the supplemental information that may be subjected to interpolation or extrapolation include the location of the base of a finger and the location of the center of a fingerprint. The calculation of the supplemental information by interpolation or extrapolation may achieve the advantage that the frequency of being able to extract a supplemental feature and a combined feature may be increased and the frequency of being able to improve the authentication accuracy may be increased.

In the above-described embodiments, the functions are performed by execution of a program by a CPU. Alternatively, the functions may be performed by another way. For example, the functions may be performed using a dedicated circuit. In the above-described embodiments, multi-biometric authentication using a fingerprint and a vein is described as an example. Alternatively, other combinations may be used. In the above-described embodiments, a plurality of biometric sensors is used in acquiring a plurality of different biometric information elements. Alternatively, a single biometric sensor may be used in acquiring a plurality of kinds of biometric information elements, and a combined feature may be extracted from the plurality of kinds of biometric information elements.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric information processing device comprising:
    a biometric sensor configured to acquire a plurality of different biometric information elements, the biometric sensor including a sensor configured to acquire a fingerprint image and a sensor configured to acquire a palm vein image;
    an authentication feature extracting unit configured to extract an authentication feature for use in authentication for each of the plurality of different biometric information elements acquired by the biometric sensor;
    a supplemental feature extracting unit configured to extract a supplemental feature relating to the authentication feature for each of the plurality of different biometric information elements; and
    a combined feature extracting unit configured to extract a combined feature in which a plurality of the supplemental features extracted by the supplemental feature extracting unit are reflected, wherein:
        the supplemental features comprise a ridge pattern acquired from the fingerprint image and a direction in which a finger extends acquired from the palm vein image, and
        the combined feature is one in which the ridge pattern is rotated in accordance with the direction in which the finger extends.

2. The device according to claim 1, further comprising:
    an authentication unit configured to perform authentication in accordance with a result of a comparison between the combined feature extracted by the combined feature extracting unit and a combined feature registered in a combined-feature database.

3. The device according to claim 2, wherein the authentication unit performs the authentication in accordance with a result of a comparison between the authentication feature extracted by the authentication feature extracting unit and an authentication feature registered in an authentication-feature database, in addition to the result of the comparison of the combined features.

4. The device according to claim 1, further comprising:
    a narrowing unit configured to narrow a plurality of users to a candidate user by comparing the combined feature extracted by the combined feature extracting unit against combined features of the plurality of users registered in the combined-feature database; and
    an authentication unit configured to perform authentication in accordance with a result of a comparison between the authentication feature extracted by the authentication feature extracting unit and the authentication feature of the candidate user narrowed by the narrowing unit out of authentication features of a plurality of users registered in an authentication-feature database.

5. The device according to claim 1, further comprising:
    a biometric information selecting unit configured to select a combination of the biometric information elements relating to the plurality of supplemental features reflected in the combined feature,
    wherein the biometric sensor sequentially acquires the biometric information elements for each of a plurality of different biometric components at predetermined time intervals,
    wherein the biometric information selecting unit selects two biometric information elements acquired closely in time from among two successive biometric information elements in time sequence out of biometric information elements acquired from the same biometric component, the two successive biometric information elements each having a degree of similarity equal to or more than a predetermined value, and a biometric information element acquired from a different biometric component between acquisitions of the two successive biometric information elements, and
    wherein the supplemental feature extracting unit extracts the supplemental feature from each of the two biometric information elements selected by the biometric information selecting unit.

6. The device according to claim 1, wherein the authentication feature extracting unit extracts the authentication feature using the combined feature extracted by the combined feature extracting unit.

7. The device according to claim 1, wherein the biometric sensor includes a plurality of sensors configured to acquire the plurality of different biometric information elements, and wherein relative positions of the plurality of sensors are fixed.

8. The device according to claim 1, wherein the supplemental features comprise a specific point of the finger acquired from the palm vein image,
the direction in which the finger extends, and a positional range of a fingerprint acquired from the fingerprint image, and
wherein the combined feature comprises a finger type determined from the specific point of the finger, the direction in which the finger extends, and the positional range of the fingerprint.

9. The device according to claim 1, wherein the supplemental features comprise a specific point of a fingerprint acquired from the fingerprint image and a specific point of the finger acquired from the palm vein image, and
wherein the combined feature comprises a distance between the specific point of the fingerprint and the specific point of the finger.

10. The device according to claim 1, wherein the combined feature comprises a result of a determination of whether the supplemental feature is validly acquired.

11. The device according to claim 1, further comprising:
a determining unit configured to determine whether the combined feature may be extracted from the plurality of supplemental features extracted by the supplemental feature extracting unit, and
wherein the combined feature extracting unit is configured to, when the determining unit determines that the combined feature may be extracted, extract the combined feature.

12. A biometric information processing method comprising:
extracting, by a processor, an authentication feature for use in authentication for each of a plurality of different biometric information elements acquired by a biometric sensor;
extracting a supplemental feature relating to the authentication feature for each of the plurality of different biometric information elements; and
extracting a combined feature in which a plurality of the extracted supplemental features are reflected wherein;
the biometric sensor includes a sensor configured to acquire a fingerprint image and a sensor configured to acquire a palm vein image,
the supplemental features comprise a ridge pattern acquired from the fingerprint image and a direction in which a finger extends acquired from the palm vein image, and
the combined feature is one in which the ridge pattern is rotated in accordance with the direction in which the finger extends.

13. The method according to claim 12, further comprising:
performing authentication in accordance with a result of a comparison between the combined feature extracted by the extracting the combined feature and a combined feature registered in a combined-feature database.

14. The method according to claim 13, wherein, the performing the authentication performs the authentication in accordance with a result of a comparison between the authentication feature extracted in the extracting the authentication feature for the authentication and an authentication feature registered in an authentication-feature database, in addition to the result of the comparison of the combined features.

15. The method according to claim 12, further comprising:
narrowing a plurality of users to a candidate user by comparing the combined feature extracted in the extracting the combined feature against combined features of the plurality of users registered in the combined-feature database; and
performing authentication in accordance with a result of a comparison between the authentication feature extracted in the extracting the authentication feature for the authentication and the authentication feature of the candidate user narrowed in the narrowing out of authentication features of a plurality of users registered in an authentication-feature database.

16. The method according to claim 12, further comprising:
selecting a combination of the biometric information elements relating to the plurality of supplemental features reflected in the combined feature, and
sequentially acquiring the biometric information elements for each of a plurality of different biometric components at predetermined time intervals,
wherein the selecting selects two biometric information elements acquired closely in time from among two successive biometric information elements in time sequence out of biometric information elements acquired from the same biometric component, the two successive biometric information elements each having a degree of similarity equal to or more than a predetermined value, and a biometric information element acquired from a different biometric component between acquisitions of the two successive biometric information elements, and
wherein the extracting the supplemental feature extracts the supplemental feature from each of the two biometric information elements selected in the selecting.

17. A non-transitory computer-readable storage medium storing a biometric information processing program that causes a computer to execute a process comprising:
extracting an authentication feature for use in authentication for each of a plurality of different biometric information elements acquired by a biometric sensor;
extracting a supplemental feature relating to the authentication feature for each of the plurality of different biometric information elements; and
extracting a combined feature in which a plurality of the extracted supplemental features are reflected, wherein;
the biometric sensor includes a sensor configured to acquire a fingerprint image and a sensor configured to acquire a palm vein image,
the supplemental features comprise a ridge pattern acquired from the fingerprint image in a direction in which a finger extends acquired from the palm vein image, and
the combined feature is one in which the ridge pattern is rotated in accordance with the direction in which the finger extends.

* * * * *